(12) United States Patent
Kim

(10) Patent No.: US 7,437,014 B2
(45) Date of Patent: Oct. 14, 2008

(54) METHODS AND SYSTEMS FOR MODEL REDUCTION AND SYSTEM IDENTIFICATION OF DYNAMIC SYSTEMS WITH MULTIPLE INPUTS

(75) Inventor: Taehyoun Kim, Bothell, WA (US)

(73) Assignee: The Boeing Company, Chicago, IL (US)

( * ) Notice: Subject to any disclaimer, the term of this patent is extended or adjusted under 35 U.S.C. 154(b) by 861 days.

(21) Appl. No.: 10/829,130

(22) Filed: Apr. 21, 2004

(65) Prior Publication Data

US 2006/0025973 A1   Feb. 2, 2006

(51) Int. Cl.
G06K 9/40 (2006.01)
G06F 17/10 (2006.01)
G05B 13/02 (2006.01)
G06K 9/00 (2006.01)

(52) U.S. Cl. .................. 382/264; 382/100; 703/2; 700/29

(58) Field of Classification Search ............... 382/264, 382/100, 232, 248, 249, 250; 700/28, 29, 700/30, 31; 703/2
See application file for complete search history.

(56) References Cited

U.S. PATENT DOCUMENTS 6,453,308 B1 * 9/2002 Zhao et al. ............... 706/21
6,801,881 B1 * 10/2004 Shah .......................... 703/2

OTHER PUBLICATIONS

Dowell, E.H. et al., "Eigenmode Analysis in Unsteady Aerodynamics; Reduced-Order Models," Applied Mechanics Review, vol. 50, No. 6, 1997, pp. 371-386.

Hall, K. C., "Eigenanalysis of Unsteady Flows About Airfoils, Cascades, and Wings," AIAA 94-1427-CP, 1994, pp. 967-976.

Hong, M.S., et al., "Simulations of a Twin-Engine Transport Flutter Model In the Transonic Dynamics Tunnel," IFASD Paper 2003-US-44, 2003.

Hong, M.S., et al., "Evaluation of CFL3D for Unsteady Pressure and Flutter Predictions," AIAA-2003-1923, 2003.

Juang, J.-N., *Applied System Identification*, Prentice Hall Englewood Cliffs, New Jersey, 1994, "Chapter 5—System Realization Theory," pp. 121-169.

Kim, T., et al., "Reduced-Order Aeroservoelastic Model with an Unsteady Aerodynamic Eigen Formulation," AIAA Journal, vol. 35, No. 6, 1997, pp. 1087-1088.

(Continued)

*Primary Examiner*—Yon J. Couso
(74) *Attorney, Agent, or Firm*—Lee & Hayes, PLLC

(57) ABSTRACT

Methods and systems for model reduction and system identification of dynamic systems with multiple inputs are disclosed. In one embodiment, a method includes generating a plurality of statistically independent random ntunbers for use as input signals, and performing a singular-value-decomposition directly on the system response due to a simultaneous excitation of the plurality of input signals. Alternate embodiments further includes sampling individual pulse responses for the first two time steps, and constructing Hankel-like matrices from which the state-space system matrices (A, B, C, D) are obtained. Since the system response is sampled almost exclusively for the single representative input, the model construction time is significantly reduced, especially for a large-scaled dynamic systems. The plurality of input signals may be filtered tbrough a low-pass filter. Alternately, the plurality of input signals may also include applying multiple step inputs in a sequential manner, and applying multiple pulse inputs in a sequential manner.

25 Claims, 16 Drawing Sheets

OTHER PUBLICATIONS

Kim, T., "An Efficient Response-Based Modal Analysis for Dynamic Systems with Multiple Inputs," AIAA-2001-1380, 2001.

Kim, T., et al., "An Optimal Reduced-Order Aeroelastic Modeling Based on a Response-Based Modal Analysis of Unsteady CFD Models," AIAA-2001-1525, 2001.

Papoulis, A., *Probability, Random Variables, and Stochastic Processes*, McGraw-Hill Book Company, New York, New York, 1982, pp. 245-252.

Silva, W.A., et al., "Development of Reduced-Order Models for Aeroelastic Analysis and Flutter Prediction Using CFL3Dv6.0 Code," AIAA-2002-1596, 2002.

* cited by examiner

Table 1: CPUs of ERAs Applied to VLM (ROM I.)

| $N_s$ | Pulse/ERA | SCI/ERA |
|---|---|---|
| 1 | 12.3 sec (92) | 6.7 sec (89) |
| 2 | 74.8 sec (180) | 16.6 sec (182) |
| 3 | 150.8 sec (221) | 20.6 sec (226) |
| 4 | 327.8 sec (297) | 28.2 sec (298) |
| 5 | 762.3 sec (336) | 43.7 sec (340) |
| 6 | 1,525.5 sec (395) | 63.2 sec (413) |

NOTE: Number in ( ) is the size of ROM.

Table 2: CPUs of ERAs Applied to VLM (ROM II.)

| $N_s$ | Pulse/ERA | SCI/ERA |
|---|---|---|
| 1 | 6.3 sec (92) | 6.8 sec (89) |
| 2 | 32.8 sec (169) | 17.00 sec (167) |
| 3 | 65.9 sec (215) | 21.0 sec (214) |
| 4 | 130.1 sec (258) | 27.6 sec (257) |
| 5 | 279.6 sec (304) | 44.1 sec (305) |
| 6 | 540.4 sec (316) | 61.4 sec (329) |

NOTE: Number in ( ) is the size of ROM.

*FIG. 15*

METHODS AND SYSTEMS FOR MODEL REDUCTION AND SYSTEM IDENTIFICATION OF DYNAMIC SYSTEMS WITH MULTIPLE INPUTS

FIELD OF THE INVENTION

This invention relates generally to methods and systems for efficient model reduction and system identification of dynamic systems, and more specifically, for linear dynamic systems having multiple inputs using a new Eigensystem Realization Algorithm.

BACKGROUND OF THE INVENTION

Most modern dynamic models are constructed based on finite spatial discretizations of continuous systems, often resulting in a considerable number of degrees of freedom in the model. Consequently, for fast and efficient estimation of dynamic behavior, as well as optimizations and closed-loop control designs, a model reduction is typically performed. Desirable characteristics of a reduced-order dynamic model include that the size of the system must not be too large, the model must be robust and have a good fidelity, it must be in the state-space, time domain formulation for implementation of active control systems and nonlinear time analysis, and finally, the reduction process itself must not be too expensive.

There have been many model reduction methods available, but most of them require modifying the main frame of the computational model, and are prone to a long model construction time if the model is subjected to many driving inputs. The latter in particular is true in unsteady Computational Fluid Dynamic (CFD) applications where the moving solid boundary is often described by many structural mode inputs. For example, a typical commercial airplane simulation may involve as many as 200 structural modes.

Recently, Eigensystem Realization Algorithm (ERA) was used successfully in aeroelastic flutter predictions using a computational fluid dynamics code (CFD) developed by the NASA Langley Research Center known as CFL3D. (See Juang, J. N., *Applied System Identification*, Prentice Hall Englewood Cliffs, N.J., 1994; Silva, W. A., and Bartels, R. E., *Development of Reduced-Order Models for Aeroelastic Analysis and Flutter Prediction Using CFL3Dv6.0 Code*, AIAA-2002-1596; and Hong, M. S., Bhatia, K. G., SenGupta, G., Kim, T., Kuruvila, G., Silva, W. A., Bartels, and R., Biedron, R., *Simulations of a Twin-Engine Transport Flutter Model In the Transonic Dynamics Tunnel*, IFASD Paper 2003-US-44). The ERA method, which is usually used as a system identification technique, has a very attractive feature in that unlike model reduction methods based on Galerkin scheme (e.g., Dowell, E. H., Hall, K. C., and Romanowski, M. C., *Eigenmode Analysis in Unsteady Aerodynamics: Reduced-Order Models*, Applied Mechanics Review, Vol. 50, No. 6, 1997, pp. 371-386), there is no need for on-line implementation of the algorithm. That is, the ERA method is a post-processing tool that identifies and generates system matrices based on the input and output data alone.

FIG. 1 is a schematic view of the ERA (a.k.a. Pulse/ERA) method 100 of modeling a dynamic system in accordance with the prior art. For simplicity, only its fundamental state-space realization theory which is attributed to Ho and Kalman is discussed. (see Ho, B. L. and Kalman, R. E., *Effective Construction of Linear State-Variable Models from Input/Output Data*, Proceedings of the 3rd Annual Allerton Conference on Circuit and System Theory, 1965, pp. 449-459). For a general description of the Pulse/ERA method, see Juang, J.-N. and Pappa, R. S., *An Eigensystem Realization Algorithm for Modal Parameter Identification and Model Reduction*, Journal of Guidance, Control, and Dynamics, Vol. 8, 1985, pp. 620-627.

In the Pulse/ERA method 100, it is assumed that the dynamic system under consideration can be described in the following finite-dimensional, discrete-time form:

$$x^{n+1} = Ax^n + Bu^n \quad (1)$$

$$y^n = Cx^n + Du^n \quad (2)$$

where $$x \equiv (L \times 1) \text{ state vector} \quad (3)$$

$$u \equiv (N_i \times 1) \text{ input vector} \quad (4)$$

$$y \equiv (N_0 \times 1) \text{ output vector} \quad (5)$$

The system matrices (A, B), (A, C) are assumed controllable and observable. First, given M+1 equally distributed time steps, $$t^n \equiv n\Delta t \quad (n = 0, 1, 2, \ldots, M),$$

for a single i-th input vector the system output is sampled subjected to the unit pulse, $$u_i^n = \delta^{ni} \equiv \begin{cases} 1 & (n = 0) \\ 0 & (ni = 1, 2, \ldots, M) \end{cases} \quad (6)$$

Assuming zero initial condition, $x^0 = x(0) = 0$, one obtains $$y_i^0 = d_i$$
$$y_i^1 = Cb_i$$
$$y_i^2 = CAb_i$$
$$y_i^3 = CA^2 b_i$$
$$\vdots$$
$$y_i^M = CA^{M-1} b_i \quad (7)$$

where $$b_i \equiv i\text{-th column of } B \quad (8)$$

$$d_i \equiv i\text{-th column of } D \quad (9)$$

The constant matrices in the above sequence are known as the Markov parameters. As shown in FIG. 1, for all inputs 102 into the dynamic system, the Markov parameters are computed (block 104) creating the sequence of pulse-response matrices:

$$Y^n \equiv |b_1^n \ y_2^n \ \ldots \ y_{Ni}^{ni}| \quad (n = 0, 1, 2, \ldots M) \quad (10)$$

Next, based on the system Markov parameters (block 104), the Pulse/ERA method 100 defines $N_0 \times (Ni \times (M-1))$ Hankel matrices:

$$H_0 \equiv |Y^1 \ Y^2 \ \ldots \ Y^{M-1}| \quad (11)$$
$$\equiv C|I \ A \ A^2 \ \ldots \ A^{M-2}|B$$

$$H_1 \equiv |Y^2 \ Y^3 \ \ldots \ Y^M| \quad (12)$$
$$\equiv C|A \ A^2 \ \ldots \ A^{M-1}|B$$

Singular-value-decomposition (SVD) of $H_0$ yields $$H_0 \equiv U \sum V^T \qquad (13)$$

$$\simeq | U_R \quad U_D | \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T$$

where $R \equiv \text{rank}(H_0)$. Finally, a balanced realization of the system under question is obtained by pseudo-inverting various submatrix components (block 108 of FIG. 1) as follows:

$$D = Y^0 (N_0 \times 1) \qquad (14)$$

$$C \simeq U_R \sum_R^{1/2} (N_0 \times R) \qquad (15)$$

$$B \simeq \text{the first } N_i \text{ columns of } \sum_R^{1/2} V_R^T \ (R \times N_i) \qquad (16)$$

$$A \simeq \sum_R^{-1/2} U_R^T H_1 V_R \sum_R^{-1/2} \ (R \times R) \qquad (17)$$

Since R<<L, the above model represents a reduced-order realization of the original system. Note that the realization is optimal in that it is balanced between inputs and outputs. However, the total number of samples taken is $N_i \times (M+1)$, which increases proportional to the number of inputs. Also, for an accurate system identification $H_0$ must have sufficient columns and rows, i.e., $N_i \times (M-1)$, $\geq R$ and $N_0 \geq R$.

For a very large data set $Y^n$ with many time steps and a large number of inputs, the Eigensystem Realization Algorithm/Data Correlations (ERA/DC) method may be preferred. As described, for example, in Juang, J. N., *Applied System Identification*, Prentice Hall Englewood Cliffs, N.J., 1994, the ERA/DC method may be used to compress the amount of data and reduce the computation time required for the SVD of the Hankel matrix.

Although desirable results have been achieved using the prior art computational methods, there is room for improvement. For example, if the unsteady CFD model is driven by multiple structural inputs, as described above, the computation time required to obtain all the pulse responses increases proportional to the number of the inputs, making the ERA method undesirably slow and inefficient. Therefore, a need exists for improved methods for model reduction and system identification of large-scaled linear dynamic systems having multiple inputs

SUMMARY OF THE INVENTION

The present invention is directed to methods and systems for model reduction and system identification of dynamic systems having multiple inputs. Embodiments of the methods in accordance with the present invention may advantageously reduce the model construction and system identification time, especially for a large-scaled system, and compress the amount of output data. Furthermore, they do not require modifying the original code, and take only input and output data for the model construction. That is, it is 100% a post-processing tool.

In one embodiment, a method of model reduction and system identification includes generating a plurality of statistically independent random numbers for use as input signals, and performing a singular-value-decomposition directly on the system response due to the simultaneous excitation of all the inputs, also known as the Single-Composite-Input (SCI). In alternate embodiments, the method further includes sampling individual pulse responses for the first time and second time steps. Alternately, the input signals are filtered through a low-pass filter. The plurality of input signals may further include applying multiple step inputs in a sequential manner, and applying multiple pulse inputs in a sequential manner.

In an alternate embodiment, a method of model reduction and system identification includes generating a plurality of statistically independent random numbers for use as input signals, performing a singular-value-decomposition directly on the system response due to the Single-Composite-Input (SCI), sampling individual pulse responses for the first time and second time steps. The method further includes defining the Hankel-like matrices $H_{c0}$ and $H_{c1}$ as follows:

$$H_{c0} \equiv | y_{c0}^1 \quad y_{c0}^2 \quad \ldots \quad y_{c0}^{M-1} | \qquad (25)$$
$$= C | x^1 \quad x^2 \quad \ldots \quad x^{M-1} |$$

$$H_{c1} \equiv | y_{c1}^1 \quad y_{c1}^2 \quad \ldots \quad y_{c1}^{M-1} | \qquad (26)$$
$$= CA | x^1 \quad x^2 \quad \ldots \quad x^{M-1} |$$

SVD of $H_{c0}$ yields $$H_{c0} \equiv U \sum V^T \qquad (27)$$

$$\simeq | U_R \quad U_D | \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T$$

Finally, the method identifies the system matrices (A, B, C, D) by a least-square approximation as follows:

$$D = Y^0 \qquad (28)$$

$$C \simeq U_R \sum_R^{1/2} \qquad (29)$$

$$B \simeq \sum_R^{1/2} U_R^T Y^1 \qquad (30)$$

$$A \simeq \sum_R^{-1/2} U_R^T H_{c1} V_R \sum_R^{-1/2} \qquad (31)$$

BRIEF DESCRIPTION OF THE DRAWINGS

The preferred and alternative embodiments of the present invention are described in detail below with reference to the following drawings.

FIG. 15 shows a graph of CPU seconds spent constructing various ERA models in accordance with alternate embodiments of the present invention (on which FIG. 14 is based);

DETAILED DESCRIPTION

The present invention relates to methods and systems for model reduction and system identification of dynamic systems having multiple inputs. Many specific details of certain embodiments of the invention are set forth in the following description and in FIGS. 2-18 to provide a thorough understanding of such embodiments. One skilled in the art, however, will understand that the present invention may have additional embodiments, or that the present invention may be practiced without several of the details described in the following description.

In general, embodiments of methods in accordance with the present invention include a new, efficient discrete-time domain system identification and model reduction method for large-scaled linear dynamic systems with multiple inputs. In one embodiment, a method in accordance with the present invention is based on a modification of the classical Eigensystem Realization Algorithm (ERA) and a simultaneous injection of multiple inputs, so called the Single-Composite-Input (SCD). Since the system response is sampled almost exclusively for the single representative input instead of the multiple individual inputs, embodiments of the present invention can significantly reduce the model construction time as well as the amount of the sampled data. Derivation of the new algorithm in accordance with the present disclosure may include performing a singular value decomposition using a single set of output measurements that are not necessarily attributed to pulse inputs. Representative simulations performed using embodiments of the present invention exhibit reduced computation times and excellent results obtained from the reduced-order models, thereby showing great potential of the present invention as a linear system identification and model reduction tool for large-scaled systems subjected to multiple inputs.

Unless otherwise stated, the following nomenclature is used throughout the following detailed description:

A B C D System matrices
$A_{d1}$ $A_{d2}$ Aeroelastic system matrices
$A_s$ $B_s$ $C_s$ Structural system matrices
b Reference length
$C_{ij}$ Cross-correlation coefficient
E Expected value
K Covariance matrix defined in (48)
L Dimension of original system
M Number of time or frequency samples or Mach number
m c k Mass, damping, stiffness matrices
p ($R_1 \times 1$) generalized coordinate vector
q Dynamic pressure ($=\frac{1}{2}\rho V^2$)
R Number of chosen singular modes or the dimension of realized model
$R_1$ Number of chosen KL modes
s Laplace variable
t Real time
u ($N_i \times 1$) input or generalized structural coordinate vector
$u_i$ i-th input or structural coordinate
V Air speed
x (L×1) state or aerodynamic state vector
X Fourier transform of x
y ($N_0 \times 1$) output vector or ($N_i \times 1$) generalzied aerodynamic force vector
$y''_i$ Pulse response due to i-th input
$\phi_i$ KL mode
$\Phi$ KL modal matrix
$\rho$ Air density
$\tau$ Reduced time $$\left( \equiv \frac{Vt}{i} \right)$$

Figure 2:
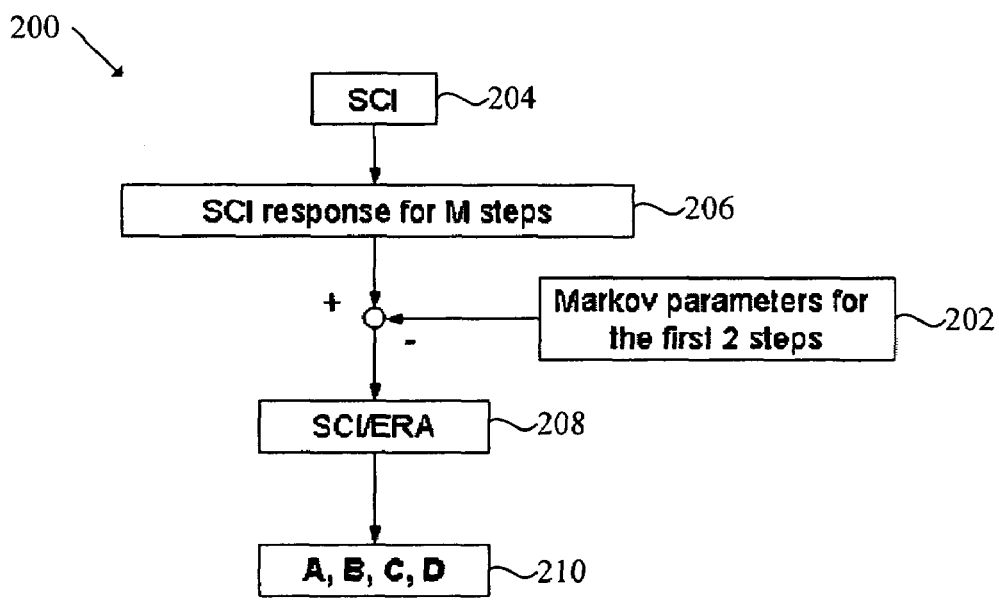
FIG. 2 is a schematic view of the SCI/ERA method in accordance with an embodiment of the present invention.

$\omega$ Frequency (rad/sec)
$\omega_c$ Maximum cut-off frequency
Subscripts
i Input
o Output
R Reduced
ref Reference
s Structure FIG. 2 is a schematic view of the Single-Composite-Input (SCI)/ERA method 200 in accordance with an embodiment of the present invention. As described more fully below, the SCI/ERA method 200 is based on the premise that for a linear system, one can apply the multiple inputs simultaneously and get all the system responses that are necessary for the model reduction. Since the computational model needs to be executed almost exclusively for the representative input, the model construction time can be significantly reduced.

Embodiments of the present invention include implementing the SCI/ERA method for fast and efficient model reduction of linear, finite-dimensional, discrete-time systems with multiple inputs. To accommodate the SCI within the framework of the Pulse/ERA, it is necessary to modify the original algorithm. In particular, as shown below, the new formulation does not rely on the system Markov parameters explicitly. Instead, it performs the singular-value-decomposition (SYD) directly on the output measurements that are in general not attributed to pulse inputs. Statistically independent random numbers are used in lieu of the pulses for the multiple input signals. Naturally, embodiments of the present invention can also be used towards experimental system identification provided that all the time measurements are available from experiments. Application of the SCI/ERA method 200 to computational fluid dynamic systems and formulation of reduced-order aeroelastic models are presented below, where it is shown that depending on how the displacement and velocity inputs on the moving boundary are treated, two different kinds of reduced-order aerodynamic and aeroelastic models may be generated.

For a demonstration of the proposed method, two CFD models are considered in the examples below. They are the Vortex Lattice Model (VLM) for inviscid, subsonic, incompressible flow, and the CFL3D for viscous, transonic, compressible flow. Reduced-order aeroelastic models are also constructed by combining the reduced aerodynamic models and the structural system. It is shown that not only does the new method shorten the model construction time substantially, but the accuracy of the resulting reduced-order models is excellent. The proposed scheme has a great potential as a linear system identification and model reduction tool for large-scaled systems subjected to multiple inputs.

With reference to FIG. 2, the SCI/ERA method 200 proceeds as follows. First, at a block 202, individual pulse responses are sampled for the first two time steps:

$$Y^0 = [\, y_1^0 \;\; y_2^0 \;\; \ldots \;\; y_{N_i}^0 \,] \tag{18}$$

$$Y^1 = [\, y_1^1 \;\; y_2^1 \;\; \ldots \;\; y_{N_i}^1 \,] \tag{19}$$

Next, at a block 204, an SCI is constructed as follows:

$$b_{SCI}^n \equiv \sum_{i=1}^{N_i} b_i r_i^n \quad \text{(for states)} \tag{20}$$

$$d_{SCI}^n \equiv \sum_{i=1}^{N_i} d_i r_i^n \quad \text{(for outputs)} \tag{21}$$

where $$r_i^n \equiv \text{a sequence of arbitrary numbers} \tag{22}$$

To ensure independency of the inputs, it is desirable that the signals be as uncorrelated as possible. In an ideal case they would be statistically uncorrelated random signals, i.e., $C_{ij}(m) = E[r_i^n \, r_j^{n-m}] = 0$ for $i \neq j$, but they are hard to construct for numerical analysis.

Subject to the SCI, at a block 206, the SCI/ERA method 200 samples the system response $y^n$ for $n = 0, 1, 2, \ldots, M$, to obtain:

$$y_{c0}^n \equiv C x^n \tag{23}$$
$$= y^n - \sum_{i=1}^{N_i} y_i^0 r_i^n$$

$$y_{c1}^n \equiv C A x^n \tag{24}$$
$$= y^{n+1} - \sum_{i=1}^{N_i} y_i^0 r_i^{n+1} - \sum_{i=1}^{N_i} y_i^1 r_i^n$$

Note that $$y_{c0}^n, y_{c1}^n$$

are measurements of the states in the reduced dimension of $C$ and $C A$.

Next, at a block 208, similar to the Hankel matrices, the SCI/ERA method 200 defines the following Hankel-like matrices:

$$H_{c0} \equiv |\, y_{c0}^1 \;\; y_{c0}^2 \;\; \ldots \;\; y_{c0}^{M-1} \,| \tag{25}$$
$$= C |\, x^1 \;\; x^2 \;\; \ldots \;\; x^{M-1} \,|$$

$$H_{c1} \equiv |\, y_{c1}^1 \;\; y_{c1}^2 \;\; \ldots \;\; y_{c1}^{M-1} \,| \tag{26}$$
$$= CA |\, x^1 \;\; x^2 \;\; \ldots \;\; x^{M-1} \,|$$

SVD of $H_{c0}$ yields $$H_{c0} \equiv U \sum V^T \tag{27}$$
$$\simeq |\, U_R \;\; U_D \,| \begin{bmatrix} \sum_R & 0 \\ 0 & 0 \end{bmatrix} \begin{bmatrix} V_R^T \\ V_D^T \end{bmatrix}$$
$$= U_R \sum_R^{1/2} \sum_R^{1/2} V_R^T$$

where $R \equiv \text{rank}(H_{c0})$. The size of the above matrices is $N_0 \times (M-1)$, $N_i$ times smaller than the previous $H_0$, $H_1$ defined in the Pulse/ERA.

Thus, at a block 210, the new realization is then $$D = Y^0 \tag{28}$$

$$C \simeq U_R \sum_R^{1/2} \tag{29}$$

$$B \simeq \sum_R^{-1/2} U_R^T Y^1 \tag{30}$$

$$A \simeq \sum_R^{-1/2} U_R^T H_{c1} V_R \sum_R^{-1/2} \tag{31}$$

Figure 1:
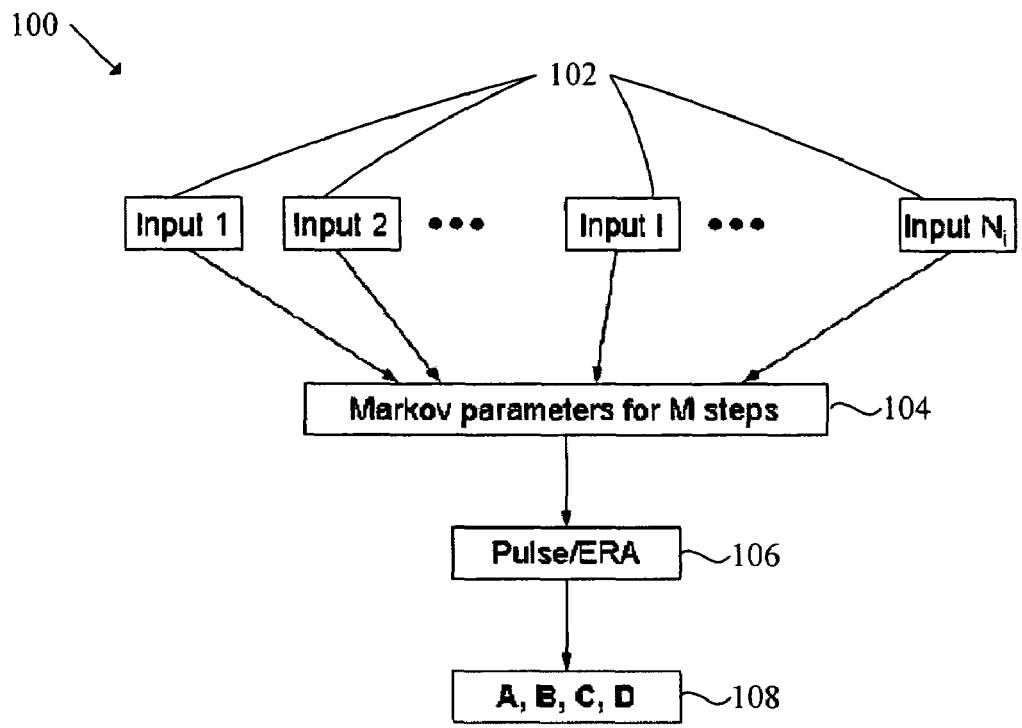
FIG. 1 is a schematic view of the Pulse/ERA method in accordance with the prior art.

Unlike the Pulse/ERA method 100 described above with reference to FIG. 1, the SCI/ERA method 200 may be optimal in that it may be balanced between states and outputs. As in the previous method 100, for an accurate realization $H_{c0}$ must have $(M-1) \geqq R$ and $N_0 \geqq R$. However, using the SCI/ERA method 200 in accordance with the present invention, the total number of samples taken may be only $M + 1 + 2 \times N_i$ which is much less than the previous $N_i \times (M+1)$ when $M$ samples of pulse response are taken for each input.

It will be appreciated that compared to the prior art Pulse/ERA method 100, embodiments of the present invention may advantageously require a much smaller set of time measurements, thereby reducing significantly both the computation time and the bulk of the output data. Furthermore, the new $H_{c0}$, $H_{c1}$ are constructed based on the sampled system states subjected to combined random inputs, and as such they are not directly related to the Markov parameters. However, at block 202 embodiments of the present invention (e.g. the SCI/ERA method 200 shown in FIG. 2) do require the first two pulse responses $$y_i^0$$

and $$y_i^1$$

for each input in order to estimate the state measurements according to Equations (23) and (24).

Although the use of random signals is described, other types of signals can also be used for the SCI provided that they are statistically independent. For a linear system, any arbitrary response contains the fundamental characteristics under the assumption that the system is controllable and observable. Embodiments of the present invention may advantageously employ this principle, along with the principle of superposition.

An alternate embodiment to the SCI/ERA method discussed above will now be described. As stated above, an important requirement in any ERA method is that to improve the accuracy of the model construction, one must have a sufficient number of output measurements, more than the number of singular modes that are extractable from the Hankel or Hankel-like matrices. Failure to satisfy this requirement implies that we don't have enough modes to approximate the system response. When the requirement is not met, assuming again that (A, C) is observable we can expand the data matrices by sampling additional responses as follows:

$$H_{c0} \equiv \begin{bmatrix} C \\ CA \\ CA^2 \\ \vdots \\ CA^K \end{bmatrix} [x^1 x^2 \ldots x^{M-1}] \quad (32)$$

$$= \begin{bmatrix} y_{c0}^1 & y_{c0}^2 & \cdots & y_{c0}^{M-1} \\ y_{c1}^1 & y_{c1}^2 & \cdots & y_{c1}^{M-1} \\ \cdots & \cdots & \cdots & \cdots \\ y_{cK}^1 & y_{cK}^2 & \cdots & y_{cK}^{M-1} \end{bmatrix}$$

$$H_{c11} \equiv \begin{bmatrix} C \\ CA \\ CA^2 \\ \vdots \\ CA^K \end{bmatrix} A[x^1 x^2 \ldots x^{M-1}] \quad (33)$$

$$= \begin{bmatrix} y_{c1}^1 & y_{c1}^2 & \cdots & y_{c1}^{M-1} \\ y_{c2}^1 & y_{c2}^2 & \cdots & y_{c2}^{M-1} \\ \cdots & \cdots & \cdots & \cdots \\ y_{cK+1}^1 & y_{cK+1}^2 & \cdots & y_{cK+1}^{M-1} \end{bmatrix}$$

where $$y_{ck}^n = CA^k x^n \quad (34)$$

$$= y^{n+k} - \sum_{i=1}^{N_j} y_i^0 r_i^{n+k} - \sum_{i=1}^{N_j} y_i^1 r_i^{n+k} - \ldots -$$

$$\sum_{i=1}^{N_j} y_i^k r_i^m$$

$$y^{n+k} - \sum_{j=1}^{k+1} \sum_{i=1}^{N_j} y_i^{j-1} r_i^{n+1+k+1-j}$$

SVD of the new $H_{c0}$ leads to $$H_{c01} \equiv U_1 \sum_i V_1^T \quad (35)$$

-continued $$\simeq [U_{1R} U_{1D}] \begin{bmatrix} \sum_{1R} & 0 \\ 0 & 0 \end{bmatrix} \begin{bmatrix} V_{1R}^T \\ V_{1D}^T \end{bmatrix}$$

$$= U_{1R} \sum_{1R}^{1/2} \sum_{1R}^{1/2} V_{1R}^T$$

from which we obtain $$D = \text{the first } N_0 \text{ rows of } Y_c^0 \quad (36)$$

$$C \simeq \text{the first } N_0 \text{ rows of } U_{1R} \sum_{1R}^{1/2} \quad (37)$$

$$B \simeq \sum_{1R}^{-1/2} U_{1R}^T Y_c^1 \quad (38)$$

$$A \simeq \sum_{1R}^{-1/2} U_{1R}^T H_{c11} V_{1R} \sum_{1R}^{-1/2} \quad (39)$$

where $$Y_c^n \equiv \begin{bmatrix} y_1^n & y_2^n & \cdots & y_{Ni}^n \\ y_1^{n+1} & y_2^{n+1} & \cdots & y_{ni}^{n+1} \\ \cdots & \cdots & \cdots & \cdots \\ y_1^{n+K+1} & y_2^{n+K+1} & \cdots & y_{Ni}^{n+K+1} \end{bmatrix} (n = 0.1) \quad (40)$$

Using this alternate approach, the total number of measurements available is now $(K+1) \times N_0$. It is noted that the additional time samples are required for the pulse response as well as for the response due to the SCI. More specifically, if K blocks of outputs are to be added pulse responses due to each input must be sampled at K additional time steps in addition the first two time steps, $$t = 0 \text{ and } t = \Delta t.$$

Also, the response due to the SCI must be sampled at K additional steps beyond the M-th step. The total number of samples to be taken is thus $M+1+K+(2+K) \times N_i$. K should desirably be sufficiently large enough to satisfy the measurement requirement, $(K+1) \times N_0 \geq R$. Needless to say, this alternate scheme requires extra computation time because of the additional time samples required in the data set.

A few candidate signals for the SCI will now be described. For an ideal linear model any of these SCIs can be used and all of them should yield ROMs of essentially the same quality.

As noted above, random signals may be used for construction of SCI. This approach may be referred to as random inputs SCI (RSCI). That is, use $$r_i^n \equiv \text{a sequence of random numbers} \quad (41)$$

in Equations (20) and (21) above.

Alternately, a filtered inputs based SCI (FSCI) may be employed. More specifically, to inject smooth inputs, one can filter the random signals through a low-pass filter. That is, $$r_i^n = r_{ji}^n \tag{42}$$
$$\equiv \text{a sequence of filtered random numbers}$$

Using such low frequency signals may allow better convergence when applying the SCI to CFD models. Furthermore, since the frequency content is limited, it is possible to generate a smaller ROM directly from the SCI/ERA without any further reduction. A potential drawback is that if the filtered signals become too narrowly banded, they may not be as uncorrelated as desired. However, based on the theory of ergodicity [9], the statistical independence could be fortified by using longer signals and sampling the response for a longer period of time. (see, e.g., Papoulis, A., *Probability, Random Variables, and Stochastic Processes*, McGraw-Hill Book Company, New York, N.Y., 1982, incorporated herein by reference).

In another approach, a step input based SCI (SCCI) may be used. In analogy to a single step input, one can apply multiple step inputs in a sequential manner:

$$r_i^n = u_i^{n-k_i} \tag{43}$$
$$\equiv \text{a step input applied at } k_i\text{-th step}$$

where $$u_i^{n-k_i} \equiv \begin{Bmatrix} 0 & (n = 1, 2, \ldots, k_i - 1) \\ 1 & (n \geq k_i) \end{Bmatrix} \tag{44}$$

To assure independence of the inputs, the onsets of the signals should be apart from each other by a sufficient number of steps, i.e., $k_i$ must be large enough.

Similarly, in another alternate approach, a pulse input based SCI (PSCI) may be used. In this approach, one can also apply multiple pulse inputs in a sequential manner:

$$r_i^n = \delta_i^{n-k_i} \tag{45}$$
$$\equiv \text{a step input applied at } k_i\text{-th step}$$

where $$\delta_i^{n-k_i} \equiv \begin{Bmatrix} 1 & (n = k_i) \\ 0 & (n = \text{all other points}) \end{Bmatrix} \tag{46}$$

Again, $k_i$ should be large enough to ensure independency of the applied signals.

Yet another alternate embodiment to the SCI/ERA methods discussed above will now be described. In applications of discrete-time computational models, there exist two conflicting requirements for the incremental time step $\Delta t$. For numerical convergence, one should adopt a sufficiently small $\Delta t_1$. On the other hand, given the highest frequency of interest, $\omega_c$, the Nyquist criterion requires $$\Delta t_2 \leq \frac{\pi}{\omega_c}.$$

Usually, for practical purposes $$\Delta z_2 \gg \Delta z_1.$$

For instance, in a structural model that is coupled with a CFD model for aeroelastic applications, the highest mode usually has a much lower natural frequency than the highest frequency content in the aerodynamic model. If the signals used in the SCI/ERA methods are sharp as in the random, step, or pulse inputs, the SCI will excite all the system dynamics and hence this characteristic will be carried over to the ERA based reduced-order model. As a result, the ERA reduced-order model (ROM) may be prone to have a large dimension to span the same high frequency range as the original full-order model (FOM), which suggests that there may be room for further order reduction in the ROM.

To perform a second order reduction, one can apply the Frequency-Domain Karhunen-Loeve (FDKL) method to the ERA ROM defined by matrices, (28)-(31), wherein frequency samples of the system within the given frequency range, $(-\omega_c, \omega_c)$ are used to extract optimal modes, and a new reduced-order model is constructed via the Galerkin's approximation. (see, e.g., Kim, T., *Discrete-Time Eigen Analysis and Optimal Model Reduction for Flutter & Aeroelastic Damping/Frequency Prediction Based On CFL3D-ERA*, B-ADVTECH-LLL-M02-013, BCAG, February 2003, incorporated herein by reference). In this embodiment, the optimal or so called KL modes $\varnothing_i$, are the eigenmodes of the covariance matrix K:

$$K\phi_i = \lambda_i \phi_i \tag{47}$$

where $$K_{ij} \equiv X(\omega_i) X(\omega_j)^{*T} \tag{48}$$

$$\omega_{ij} \equiv \text{sampling frequencies} \tag{49}$$
$$= [\omega_1 \ \omega_2 \ldots \omega_M]$$

where $\omega_1 = -\omega_c$ and $\omega_M = \omega_c$. $X(\omega_i)$ are the frequency solutions of the ERA ROM subjected to the single-composite-input described by (20) and (21) except that it is prescribed in the frequency domain. Once the optimal modes are obtained, assume $$x \simeq \Phi p \text{ where} \tag{50}$$

$$\Phi \equiv |\phi_1 \phi_2 \ldots \phi_{R_1}| \tag{51}$$

$$p \equiv \begin{Bmatrix} p_1 \\ p_2 \\ p_{R_1} \end{Bmatrix} \tag{52}$$

$R_1$ is set to be equal to the rank of the covariance matrix which is usually smaller than R.

After inserting (50) into (1) and (2) with the ERA ROM matrices, premultiplying both sides by $\Phi^T$ yields a new reduced-order model as $$p^{n+1} = A_1 p^n + B_1 u^n \tag{53}$$

$$Y^n = C_1 p^n + D_u^n \tag{54}$$

where $$A_1 \equiv \Phi^T A \Phi \tag{55}$$

$$B_1 \equiv \Phi^T B \tag{56}$$

$$C_1 \equiv C \Phi \tag{57}$$

The dimension of the new model is $(R_1 \times R_1)$.

Application of various embodiments of methods and systems to representative, large-scaled CFD models will now be described. Unlike the general system described by Equations (1) and (2), an unsteady fluid dynamic system is driven by displacement and velocity of its moving boundary surface simultaneously as they both contribute to the normal downwash on the surface. If one considers a statically nonlinear, dynamically linearized flow field, the unsteady fluid motion can be described as $$x^{n+1} = Ax^n + B_0 u^n + B_1 \dot{u}^n \tag{58}$$

$$y^n = q(Cx^n + D_0 u^n + D_1 \dot{u}^n) \tag{59}$$

where $x = (L \times 1)$ fluid states (60)

$u = (N_i \times 1)$ generalized displacements (61)

$\dot{u} = (N_i \times 1)$ generalized velocities (62)

$y = (N_i \times 1)$ generalized aerodynamic forces (63)

$q =$ dynamic pressure (64)

It is noted that the above equations progress in non-dimensional time, $$\tau \equiv \frac{V_t}{b},$$

rather than in the real time t and ( ) is the first derivative with respect to $\tau$. In fact, the dependency of the normal downwash on air speed disappears when the equations are discretized in $\tau$, as in Equations (58) and (59). The structural degrees of freedom, $u_i$ are the generalized coordinates associated with structural modes. These modes are used to describe the motion of the lifting surface. Two different types of reduced-order fluid dynamic models can be obtained depending on how the inputs are treated. If necessary, the FDKL/SCI can be performed for additional reduction.

In one particular embodiment, a method in accordance with the invention may be applied to an aerodynamic ROM with displacement and velocity inputs. In this embodiment, one can treat $u^n$ and $\dot{u}^n$ separately as independent inputs. Thus, for the pulse inputs $$u_i^n = \dot{u}_i^n = \delta^n \equiv \begin{cases} 1 & (n = 0) \\ 0 & (n = 1, 2, \ldots, M) \end{cases} \tag{65}$$

for $i = 1, 2, \ldots, N_i$, we obtain the corresponding responses $$y_i^0, y_i^1$$

at the first two time steps. Let us define $$Y^0 = [y_1^0 y_2^0 \ldots y_{N_i}^0 y_{N_i+1}^0 y_{N_i+2}^0 \ldots y_{2N_i}^0] \tag{66}$$

$$Y^1 = [y_1^1 y_2^1 \ldots y_{N_i}^1 y_{N_i+1}^1 y_{N_i+2}^1 \ldots y_{2N_i}^1] \tag{67}$$

where the first $N_i$ samples are due to the pulses in $u^n$ and the next $N_i$ ones are due to the pulses in $\dot{u}^n$. Next, we prepare the following inputs, $$b_{SCI}^n \equiv \sum_{i=1}^{N_i} b_{0i} r_i^n + \sum_{i=1}^{N_i} b_{1i} r_{N_i+i}^n \tag{68}$$

$$d_{SCI}^n \equiv \sum_{i=1}^{N_i} d_{0i} r_i^n + \sum_{i=1}^{N_i} d_{1i} r_{N_i+i}^n \tag{69}$$

Subject to the SCI, we sample the system response $y^n$ and get $$y_{c0}^n \equiv y^n - \sum_{i=1}^{2N_i} y_i^0 r_i^n \tag{70}$$

$$y_{c1}^n \equiv y^{n+1} - \sum_{i=1}^{2N_i} y_i^0 r_i^{n+1} - \sum_{i=1}^{2N_i} y_i^1 r_i^n \tag{71}$$

Define $$H_{c0} \equiv |y_{c0}^1 \quad y_{c0}^2 \quad \ldots \quad y_{c0}^{M-1}| \tag{72}$$

$$H_{c1} \equiv |y_{c1}^1 \quad y_{c1}^2 \quad \ldots \quad y_{c1}^{M-1}| \tag{73}$$

where SVD of $H_{c0}$ yields $$H_{c0} \equiv U \sum V^T \tag{74}$$

$$\simeq |U_R \quad U_D| \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T$$

with $R = \text{rank}(H_{c0})$. Hence, the reduced-order model is given by $D_0 = $ the first $N_i$ columns of $Y^0$ (75)

$D_1 = $ the second $N_i$ columns of $Y^0$ (76)

$$C \simeq U_R \sum_R^{1/2} \tag{77}$$

$B_0 \simeq $ the first $N_i$ columns of $\sum_R^{-1/2} U_R^T Y^1$ (78)

$B_1 \simeq $ the second $N_i$ columns of $\sum_R^{-1/2} U_R^T Y^1$ (79)

$$A \simeq \sum_R^{-1/2} U_R^T H_{c1} V_R \sum_R^{-1/2} \tag{80}$$

In yet another particular embodiment, a method in accordance with the invention may be applied to an aerodynamic ROM with only the displacements as the system inputs. This is possible by applying simultaneously the pulse and double pulse inputs, $$u_i^n = \delta^n \equiv \begin{cases} 1 & (n=0) \\ 0 & (n=1,2,\ldots,M) \end{cases} \quad (81)$$

$$\dot{u}_i^n = \delta^n \equiv \begin{cases} \frac{1}{\Delta \tau} & (n=0) \\ -\frac{1}{\Delta \tau} & (n=1) \\ 0 & (n=2,3,\ldots,M) \end{cases} \quad (82)$$

and get the corresponding responses $$y_{di}^0, y_{di}^1$$

at the first two time steps:

$$Y_d^0 = [y_{d1}^0 \ y_{d2}^0 \ \ldots \ y_{dN_i}^0] \quad (83)$$

$$Y_d^1 = [y_{d1}^1 \ y_{d2}^1 \ \ldots \ y_{dN_i}^1] \quad (84)$$

For a new SCI, we use $$b_{SCI}^n \equiv \sum_{i=1}^{N_i} b_{0i} r_i^n + \sum_{i=1}^{N_i} b_{1i} \dot{r}_i^n \quad (85)$$

$$d_{SCI}^n \equiv \sum_{i=1}^{N_i} d_{0i} r_i^n + \sum_{i=1}^{N_i} d_{1i} \dot{r}_i^n \quad (86)$$

where $$\dot{r}_i^n$$

are discrete-time derivative of $$r_i^n.$$

To be consistent with the use of the double pulse defined in (82), $$\dot{r}_i^n$$

are obtained by filtering $$r_i^n \text{ via } \delta_i^n, \text{i.e.,}$$

$$\dot{r}_i^n \equiv conv(\dot{r}_i^k, \delta_i^k) \quad (87)$$

which is equivalent to the backward difference equation, $$\dot{r}_u^n \equiv \frac{r_i^n - r_i^{n-1}}{\Delta \tau} \quad (88)$$

Subject to the new SCI we sample the system response $y^n$ and get $$y_{dc0}^n \equiv y^n - \sum_{\dot{u}=1}^{N_i} y_{d\dot{u}}^0 \dot{r}_{\dot{u}}^n \quad (89)$$

$$y_{dc1}^n \equiv y^{n+1} - \sum_{\dot{u}=1}^{N_i} y_{d\dot{u}}^0 \dot{r}_{\dot{u}}^{n+1} - \sum_{\dot{u}=1}^{N_i} y_{d\dot{u}}^1 \dot{r}_{\dot{u}}^{n+1} \quad (90)$$

Defining $$H_{dc0} \equiv |y_{dc0}^1 \ y_{dc0}^2 \ \ldots \ y_{dc0}^{M-1}| \quad (91)$$

$$H_{dc1} \equiv |y_{dc1}^1 \ y_{dc1}^2 \ \ldots \ y_{dc1}^{M-1}| \quad (92)$$

the SVD of $H_{dc0}$ yields $$H_{dc0} \equiv U \sum V^T \quad (93)$$

$$\simeq |U_R \ U_D| \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T$$

with $R = \text{rank}(H_{dc0})$. The new reduced-order model has only $N_i$ input channels and is in the form $$x = Ax^n + Bu^n \quad (94)$$

$$y^n = q(Cx^n + Du^n) \text{ where} \quad (95)$$

$$D = Y^0 \quad (96)$$

$$C \simeq U_R \Sigma_R^{1/2} \quad (97)$$

$$B \simeq \Sigma_R^{-1/2} U_R^T Y^1 \quad (98)$$

$$A \simeq \Sigma_R^{-1/2} U_R^T H V_R \Sigma_R^{-1/2} \quad (99)$$

Embodiments of aeroelastic systems in accordance with the present invention can be constructed using the embodiments of reduced-order aerodynamic models described above. For example, in one embodiment, we first note that structural model is normally described in real, continuous-time:

$$m\ddot{u} + c\dot{u} + ku = y \quad (100)$$

() and () respectively, represent the first and the second derivatives with respect to t. Hence, to construct aeroelastic model the continuous-time equation (100) is discretized in time:

$$z^{n+1} = A_s z^n + B_s y^n \quad (101)$$

$$u^n = C z^n \text{ where} \quad (102)$$

$$z \equiv \begin{Bmatrix} u \\ \dot{u} \end{Bmatrix} \quad (103)$$

$$C \equiv [I \quad 0] \quad (104)$$

Note that given $\Delta \tau$ and V the consistent incremental time step $$\Delta t = \frac{\Delta \tau b}{V}$$

must be used in the conversion to the discrete-time.

Aeroelastic Model I

In this approach, we treat the displacement and velocity, $u^n$, $\dot{u}^n$ as independent inputs and apply the $b_{SCI}{}^n$, $d_{SCI}{}^n$ given by Eqs. (68) and (69) at a reference dynamic pressure, $$\text{ref} \equiv \frac{1}{2}\text{ref } V_{ref}^2.$$

The corresponding samples are taken and scaled by $$\frac{1}{\text{ref}}.$$

The ROM of the first kind described above is then obtained by applying the SCI/ERA. An aeroelastic system that is valid at all V can be constructed by combining the resulting aerodynamic ROM with the structural equations:

$$X^{n+1} = AX^n \text{ where} \quad (105)$$

$$X \equiv \begin{Bmatrix} x \\ z \end{Bmatrix} \quad (106)$$

$$A \equiv \begin{bmatrix} A & |BB_1| \\ qB_sC & A_s + qB|DD_1| \end{bmatrix} \quad (107)$$

Denoting the eigenvalues of system matrix (107) as $$\lambda_{dl,\dot{z}},$$

the aeroelastic eigenvalues in the Laplace domain are obtained as $$\lambda_{cl,i} = \frac{\log(\lambda_{cl,i})}{\Delta f} \quad (108)$$

For flutter instability, one must have $$\text{Real}(\lambda_{dl,\dot{z}}) > 0 \text{ and } I \sim \sim \|\lambda_{dl,\dot{z}}\| > 1$$

for any i.

Aeroelastic Model II.

One can also apply the $$b_{SCI}^n, d_{SCI}^n$$

given by Equations (85) and (86) and get the ROM of the second kind described above. This will produce aerodynamic system matrices, A, B, C, and D where B, D each has only $N_i$ columns. The new resulting reduced-order aeroelastic model can be obtained as $$X^{n+1} = A_{i2} X^n \quad (109)$$

where $$A_{d2} \equiv \begin{bmatrix} A & BC_s \\ qB_sC & A_s + qB_s DC_s \end{bmatrix} \quad (110)$$

Although q can change in Equation (110), this model must be used only at the reference air speed $V_{ref}$. Given a local angle of attack u, plunging rate $\dot{u}$, and local air speed V the total aerodynamic downwash at the moving boundary is $\dot{u}+V$u and as such it is impossible to separate out and account for the effect of V without having both the displacement and velocity channels. However, this drawback is easily remedied by adjusting the incremental time step according to $$\Delta t = \frac{\Delta \tau b}{V}$$

when the air speed changes from one value to another and discretizing the structural model based on the new $\Delta t$. That is, if one leaves the V dependency in the structure, $$A_{d2} \equiv \begin{bmatrix} A & BC_s \\ qB_s(V)C & A_s(V) + qB_s(V)DC_s \end{bmatrix} \quad (111)$$

then the Aeroelastic Model II becomes valid for all air speeds.

Figure 3:
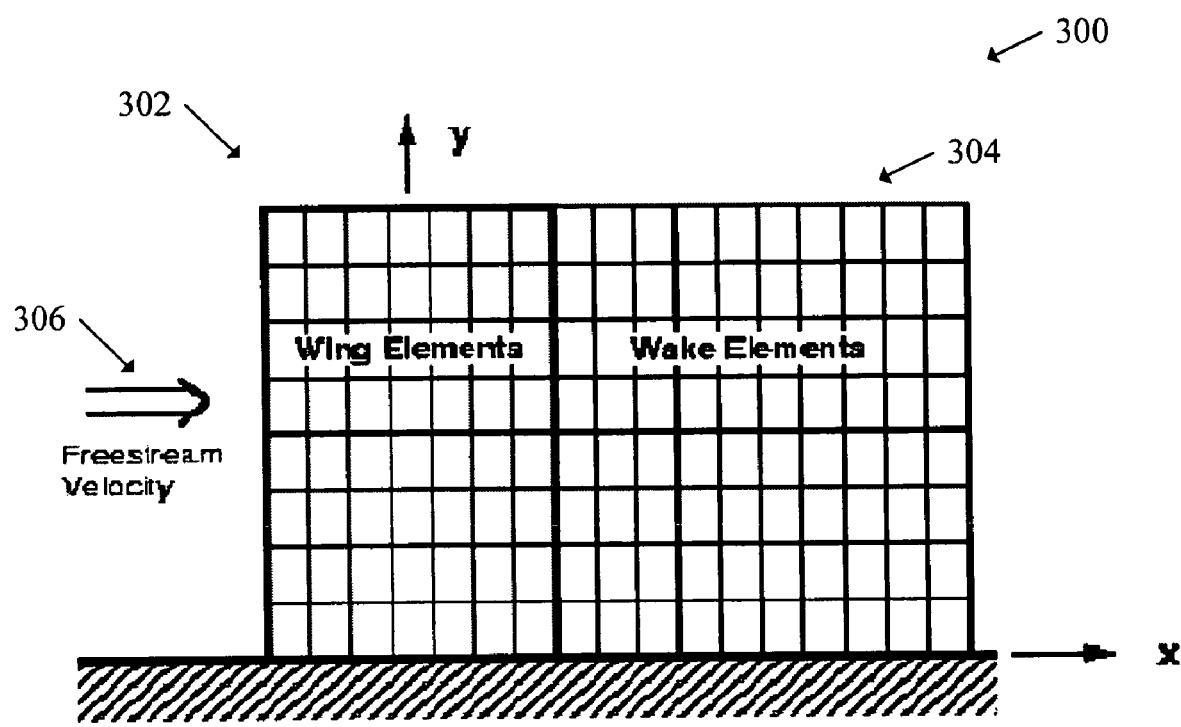
FIG. 3 is a schematic view of a vortex lattice model for computing an unsteady flow field around a flat, rectangular wing in accordance with an embodiment of the present invention.

To demonstrate an embodiment of the present invention, an unsteady vortex lattice aerodynamic model subjected to several structural mode inputs may be considered. For example, FIG. 3 is a schematic view of a vortex lattice formulation 300 for computing an unsteady flow field around a flat, rectangular wing 302 in accordance with an embodiment of the present invention. In this embodiment, the unsteady flow field is modeled as an incompressible, subsonic air flow. In this example, the wing 302 is 3 inches wide and 12 inches long, has 10 and 20 vortex elements in the chordwise and spanwise directions, respectively. A free wake 304 has 40 and 20 vortex elements in the streamwise and spanwise directions, creating a total of 800 degrees of freedom. (see Kim, T., Nam, C., and Kim, Y., 1997, *Reduced-Order Aeroservoelastic Model with an Unsteady Aerodynamic Eigen Formulation*, AIAA Journal, Vol. 35, No. 6, pp. 1087-1088, incorporated herein by reference). The wing structure is modeled using 6 vibrational (3 bending and 3 torsional) modes (see Crawley, E. F., and Dugundji, J., 1980, *Frequency Determination and Non-Dimensionalization for Composite Cantilever Plates*, Journal Sound and Vibration, Vol. 72, No. 1, pp. 1-10, incorporated herein by reference).

No structural damping was introduced in this example. Thus, the size of the full-order aeroelastic model is (812× 812).

For the Aeroelastic Model I the reference air density and speed 306 were set at 1.23 kg/m$^3$, 80 m/sec, respectively. The incremental time at this reference speed is $$\Delta = \frac{dz}{V_{ref}}$$

9.525×10$^{-5}$ sec. For the sampling of the vortex model, 480 extra outputs were extracted in addition to the 6 generalized aerodynamic forces at 481 time steps. Applying 12 sets of random signal inputs simultaneously, 6 for $u''$, 6 for $\dot{u}''$, yielded a single set of sampled data. 12 pulse inputs were also applied individually at the first two time steps to generate $Y^o$ and $Y^1$.

Figure 4:
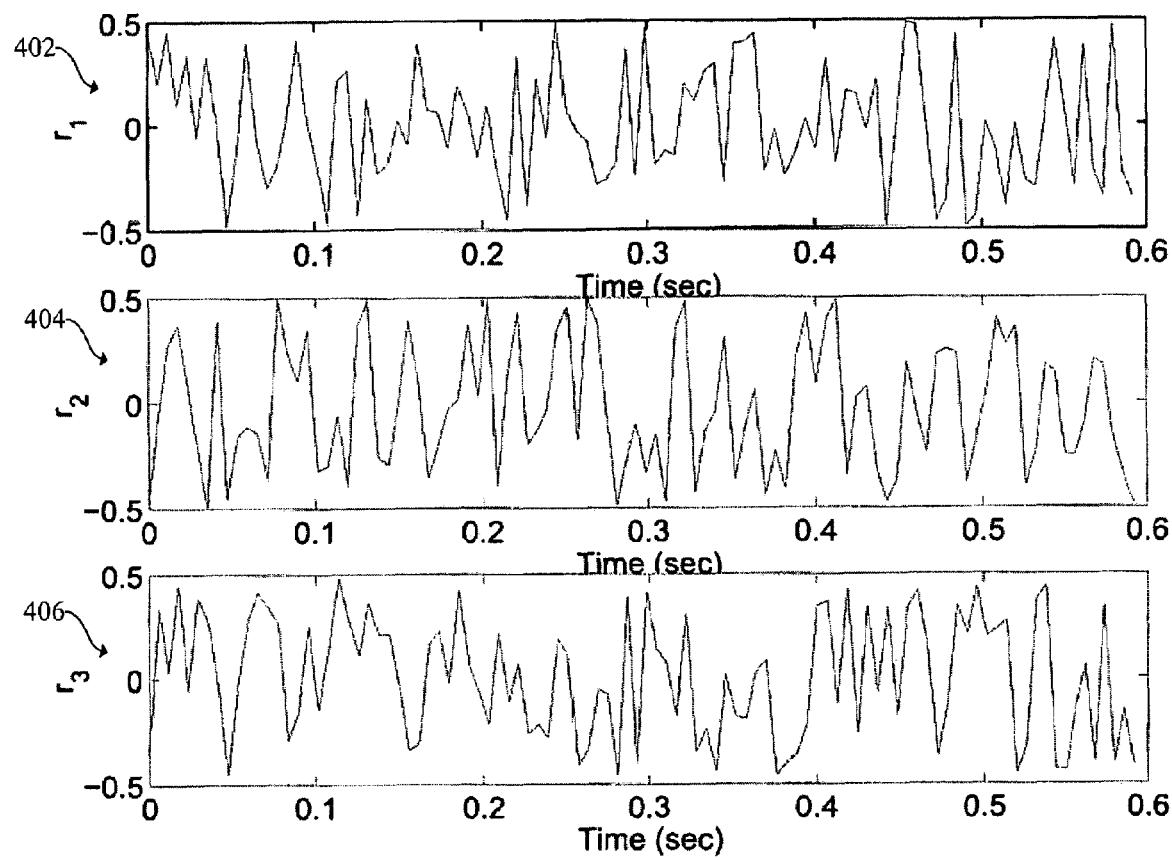
FIG. 4 shows three sets of random numbers generated as inputs to the vortex lattice formulation of FIG. 3.

FIG. 4 shows three sets of random numbers 402, 404, 406 generated as inputs to the vortex lattice formulation of FIG. 3 using the well-known MATLAB computer program. Out of 481 time samples, the SVD produced 413 linearly independent singular modes. This number was determined by the rank of $H_{c0}$ matrix. Thus, the size of the aerodynamic ROM became (413×413). The reduced-order aerodynamic model was then coupled with the structural model to create (425× 425) aeroelastic model (ROM I.).

For the Aeroelastic Model II. the reference air density and speed were again set at 1.23 kg/m$^3$, and 80 m/sec. 6 sets of random signals and 6 sets of discrete-time derivatives of the random signals were applied for $u''$ and $\dot{u}''$ using 481 time steps and the 486 output measurements. This yielded (329× 329) aerodynamic ROM which when combined with the structural system, produced (341×341) aeroelastic model (ROM II.). It is noted that ROM II. is approximately 20% smaller than ROM I. as a result of using only the half of the input channels.

Next, the dimensions of the reduced-order aerodynamic models were further decreased using the FDKL/SCI method. As mentioned earlier, the incremental time step embedded in both the FOM and SCI/ERA ROM is too small to be effective for various aeroelastic simulations which usually involve a low frequency range. Considering that the highest free vibrational frequency of the structural modes is 4,160 rad/sec, the sampling range in the FDKL method was restricted to (−4, 500, 4,500) rad/sec. For the ROM I., out of 174 frequency samples within the range 129 KL modes were selected based on the rank of the covariance matrix K Hence, the size of the new reduced-order aerodynamic and aeroelastic models (ROM I.-FDKL) became 129 and 141, respectively. Likewise, for the ROM II. 97 KL modes out of 130 frequency samples in the same frequency range were selected yielding new (109×109) aeroelastic model (ROM II.-FDKL). For computational efficiency, these reduced-order models are to be preferred over the ROM I. and ROM II.

Figure 5:
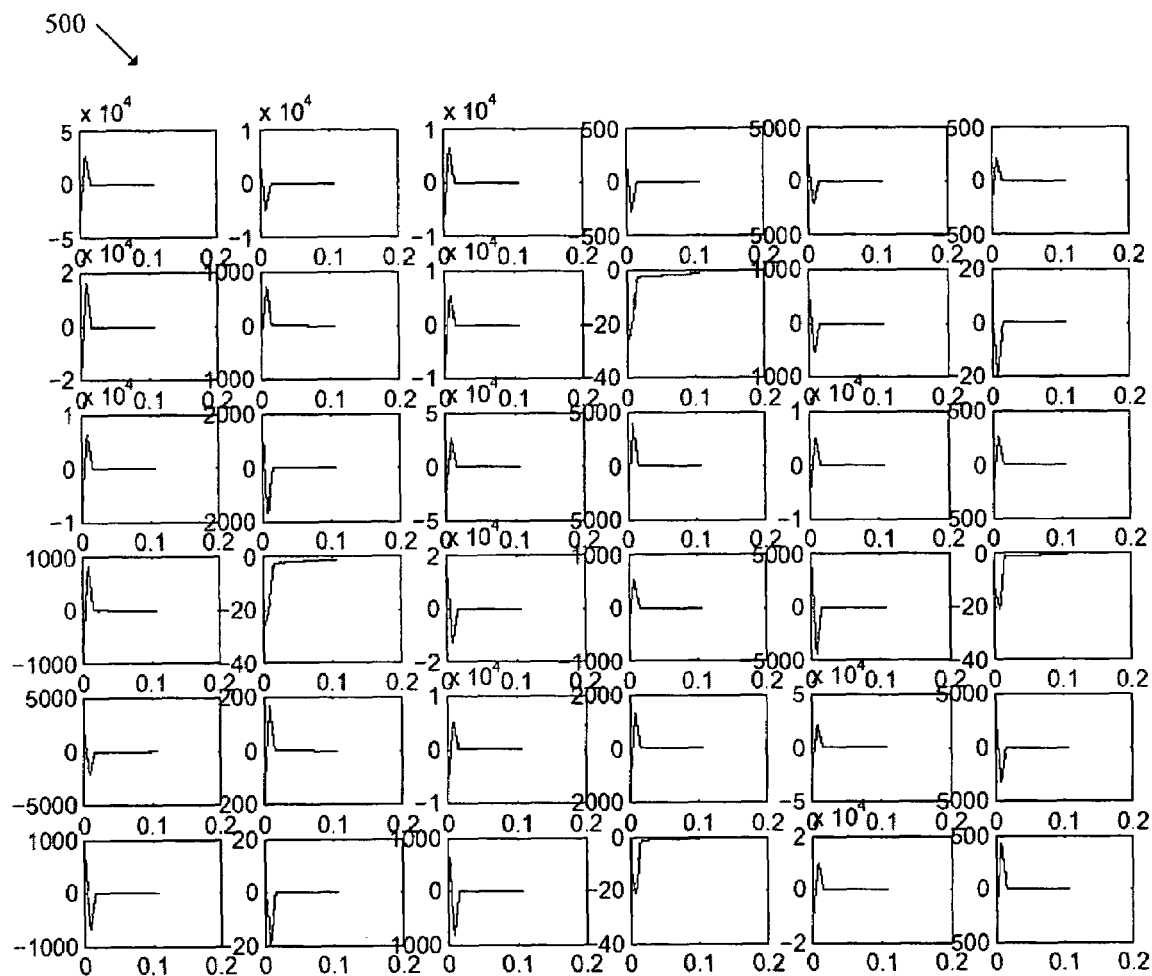
FIG. 5 shows sets of generalized aerodynamic force elements computed using the vortex lattice formulation of FIG. 3.

FIG. 5 shows three sets of generalized aerodynamic force elements 500 computed using the vortex lattice formulation of FIG. 3. Specifically, FIG. 5 shows (6×6) generalized aerodynamic forces for V=80 m/sec obtained from the FOM, ROM I.-FDKL, and ROM II.-FDKL models (FOM (800), ROM I.-FDKL(129), and ROM II.-FDKL(97)), in the nondimensional time, τ. It is seen that despite the cut-off frequency range present in the latter two models, they reproduce the pulse aerodynamic responses of the original model very well.

Figure 6:
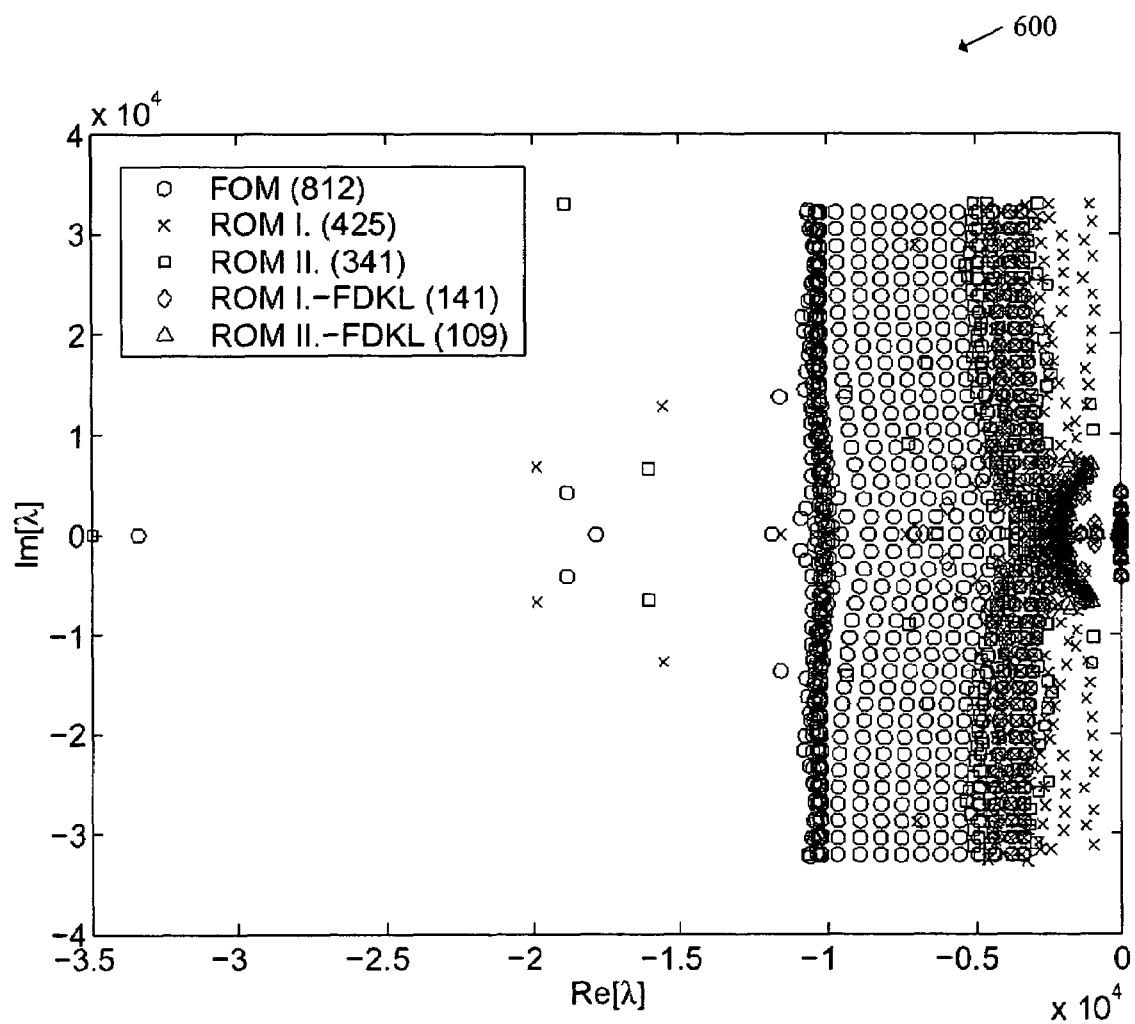
FIG. 6 shows a set of aeroelastic eigenvalues computed using the vortex lattice formulation of FIG. 3 at a first scale for V=80 m/sec.
Figure 7:
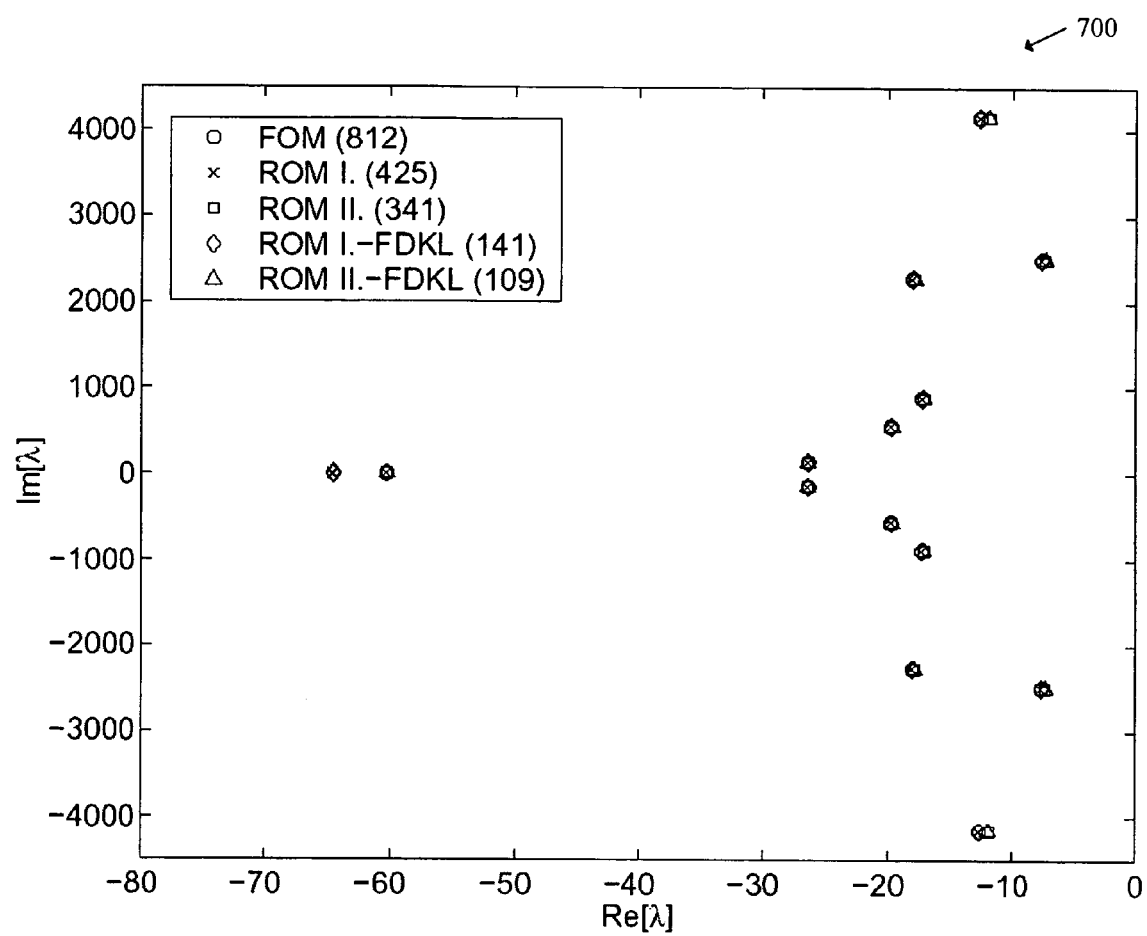
FIG. 7 shows a set of aeroelastic eigenvalues computed using the vortex lattice formulation of FIG. 3 at a second scale for V=80 m/sec.

FIGS. 6 and 7 show two different scales of the aeroelastic eigenvalues 600, 700 of the various models in the s domain at V=80 m/sec. It is seen that many eigenvalues of the reduced-order aeroelastic models match very well with those of the full model (FIG. 6). More specifically, the 12 complex eigenvalues associated with 6 structural modes agree very well between the FOM and ROMs, although the higher structural modes (5th and 6th) in the ROM II. and ROM II.-FDKL are slightly mismatched (FIG. 7). Also noteworthy is that all the eigenvalues of the ROM I.-FDKL and ROM II.-FDKL are approximately within the specified bound, (−4,500, 4,500) rad/sec as the model was obtained based on frequency samples in the range.

Figure 8:
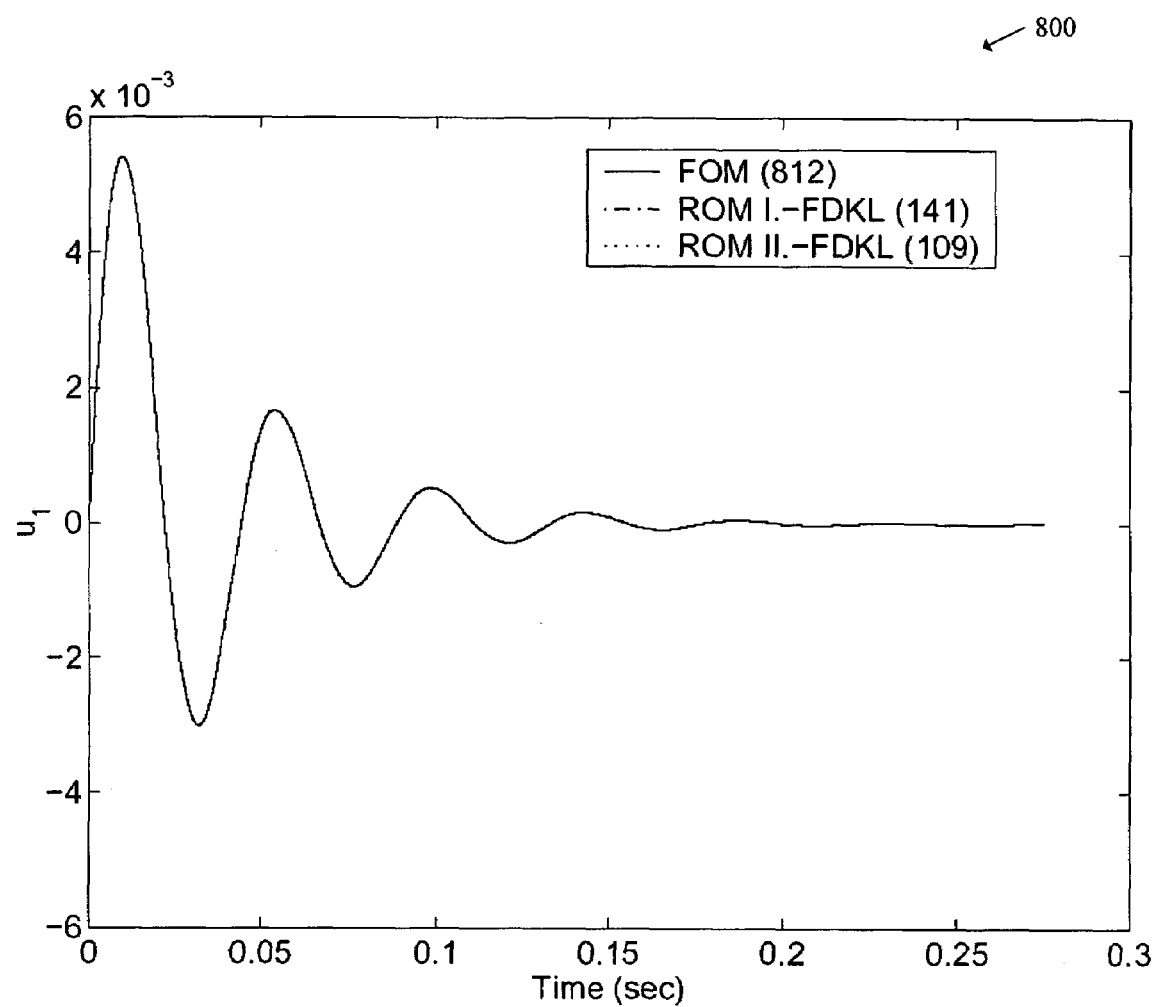
FIG. 8 shows an aeroelastic time response of the first structural mode computed using the vortex lattice formulation of FIG. 3 for V=80 m/sec.
Figure 9:
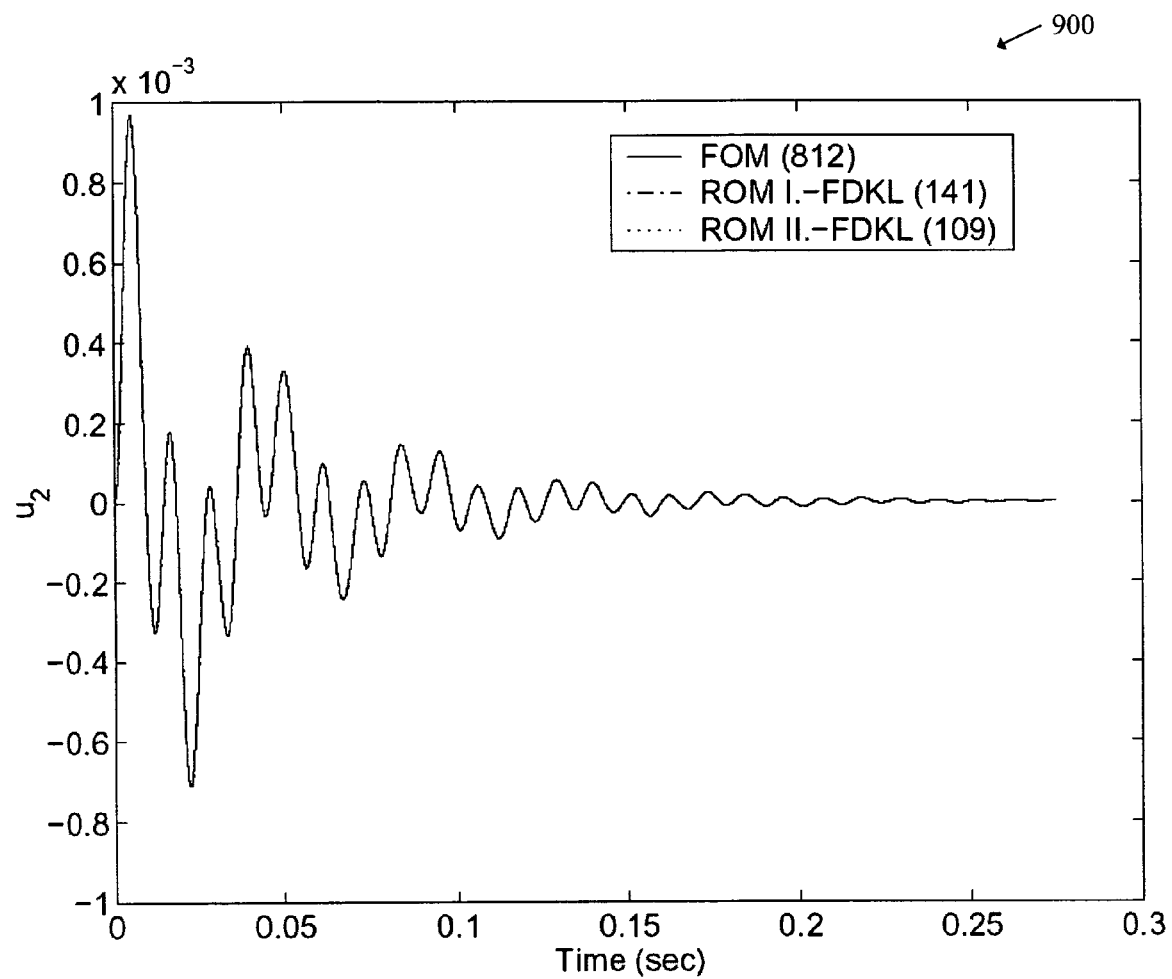
FIG. 9 shows an aeroelastic time response of the second structural mode computed using the vortex lattice formulation of FIG. 3 for V=80 m/sec.

FIGS. 8 and 9 show time responses of the first two structural modes 800, 900 due to an initial condition in velocity $\dot{u}_1$. It can be seen that the three sets of curves are practically indistinguishable from each other.

Figure 10:
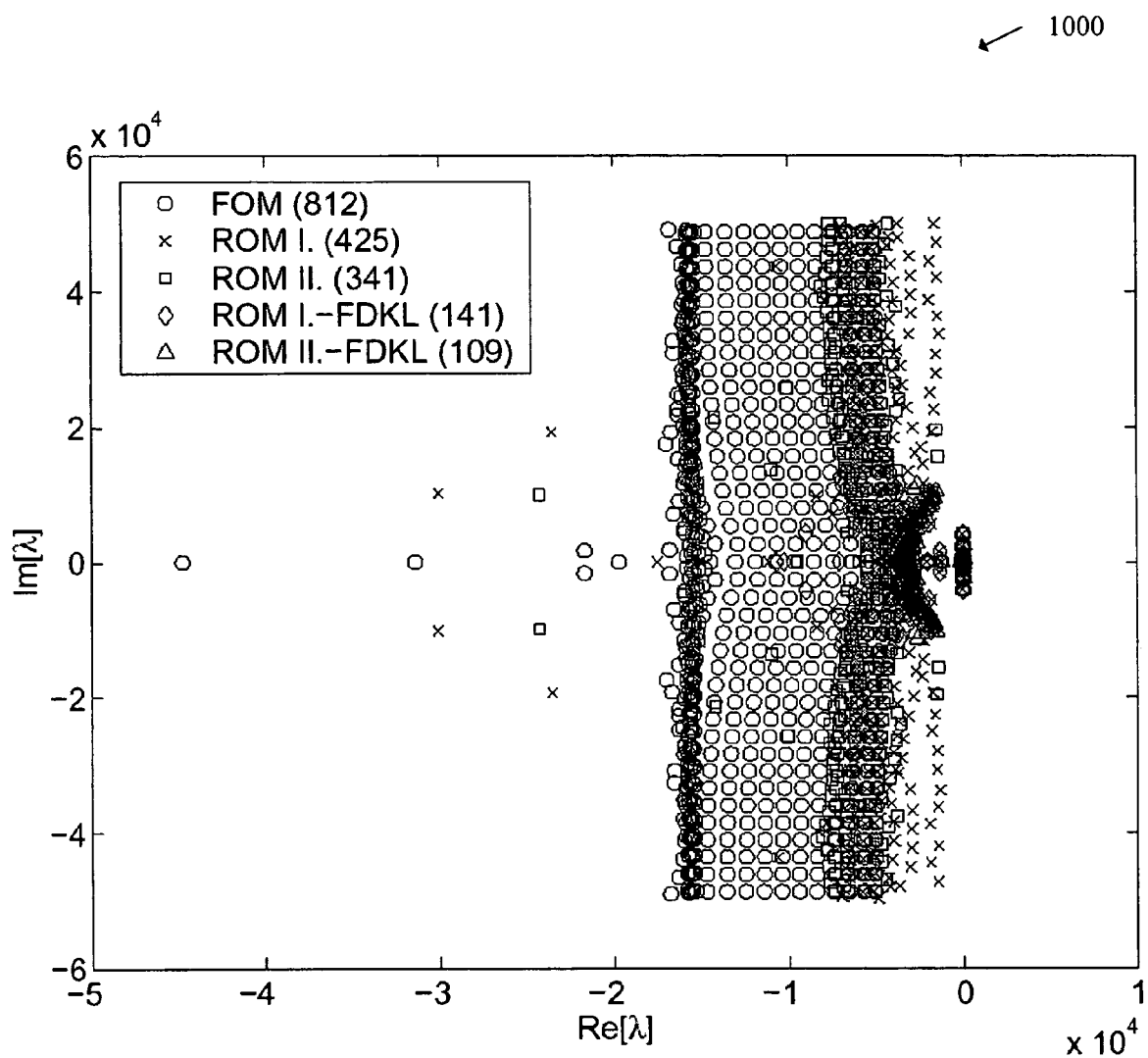
FIG. 10 shows a set of aeroelastic eigenvalues computed using the vortex lattice formulation of FIG. 3 at a first scale for V=121.2 m/sec.
Figure 11:
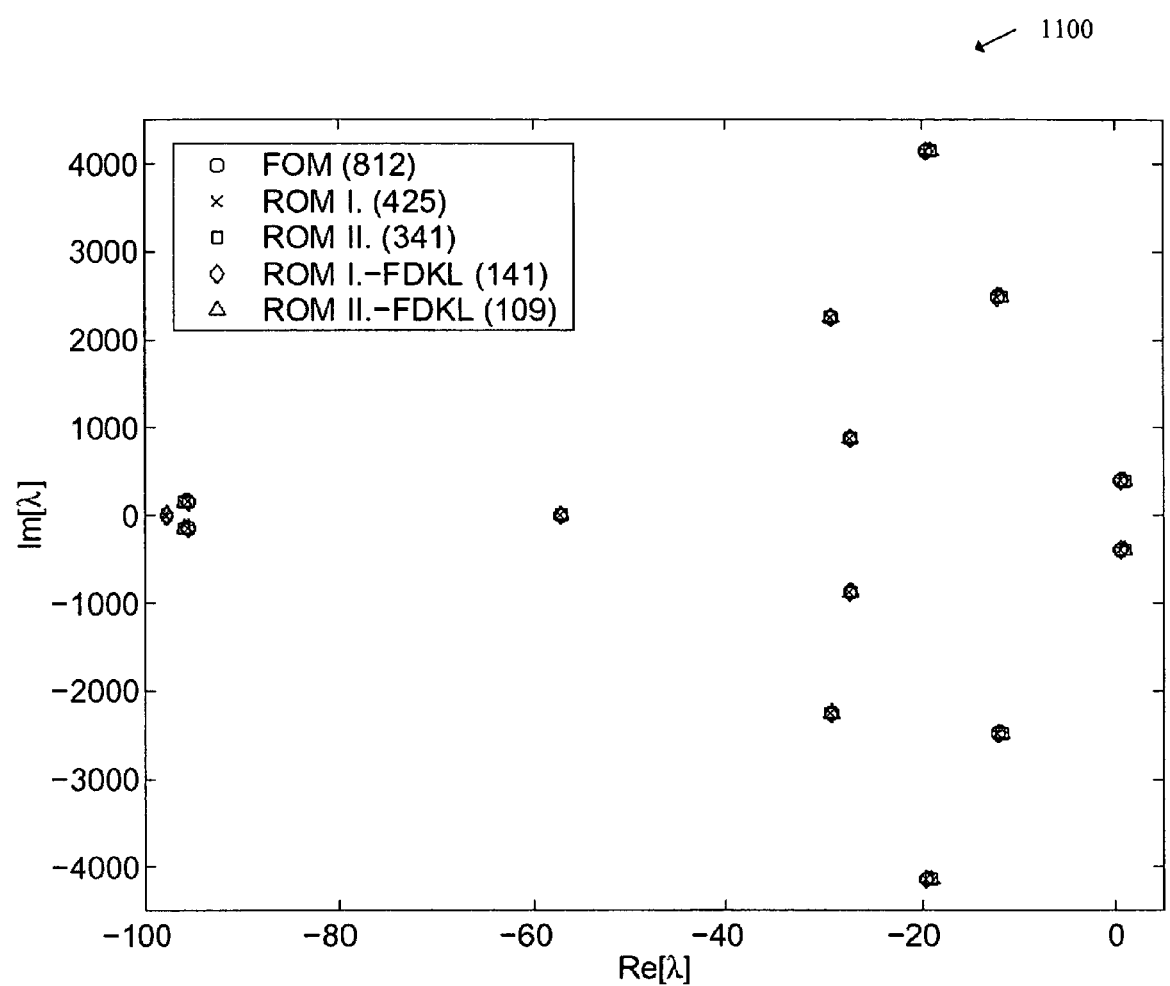
FIG. 11 shows a set of aeroelastic eigenvalues computed using the vortex lattice formulation of FIG. 3 at a second scale for V=121.2 m/sec.
Figure 12:
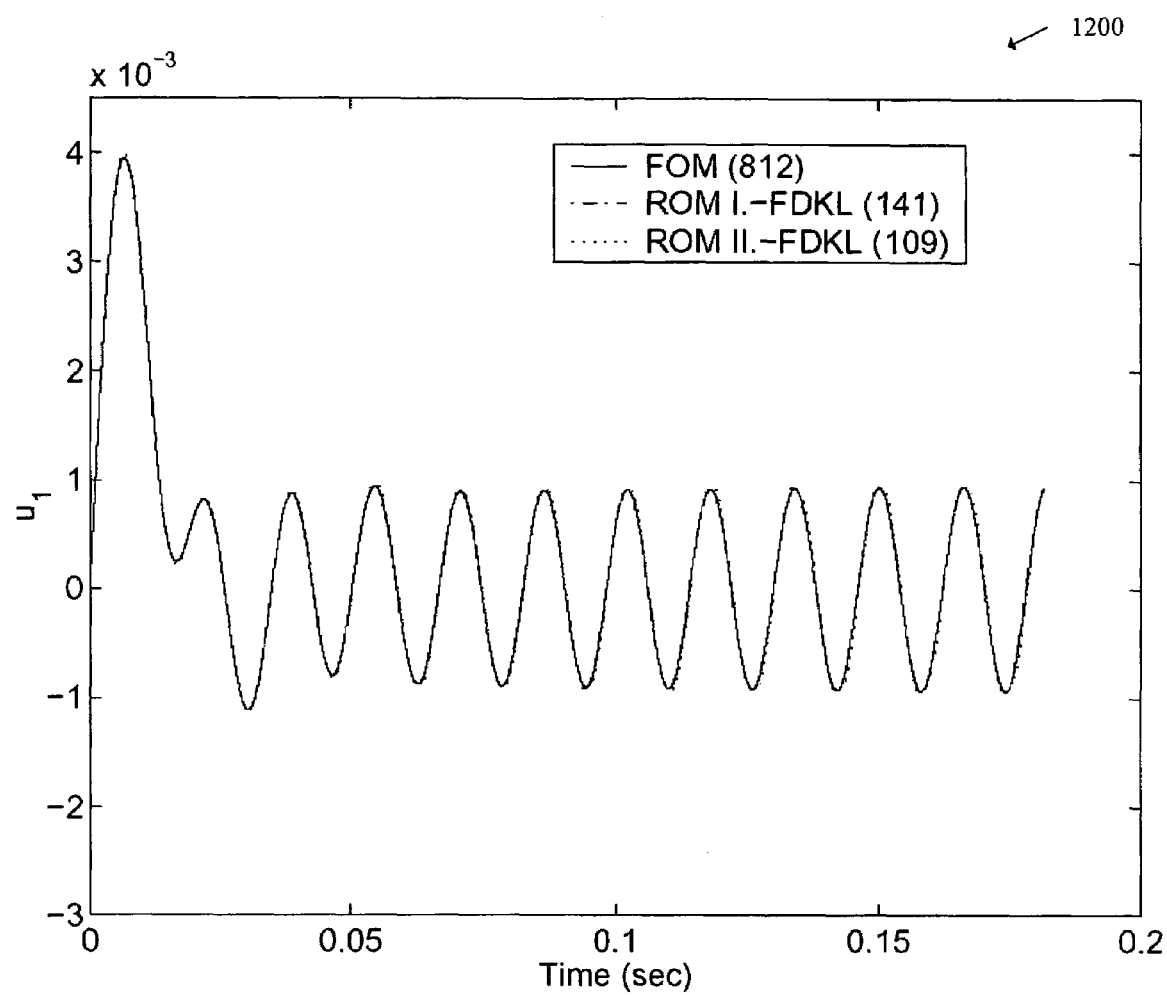
FIG. 12 shows an aeroelastic time response of the first structural mode computed using the vortex lattice formulation of FIG. 3 for V=121.2 m/sec.
Figure 13:
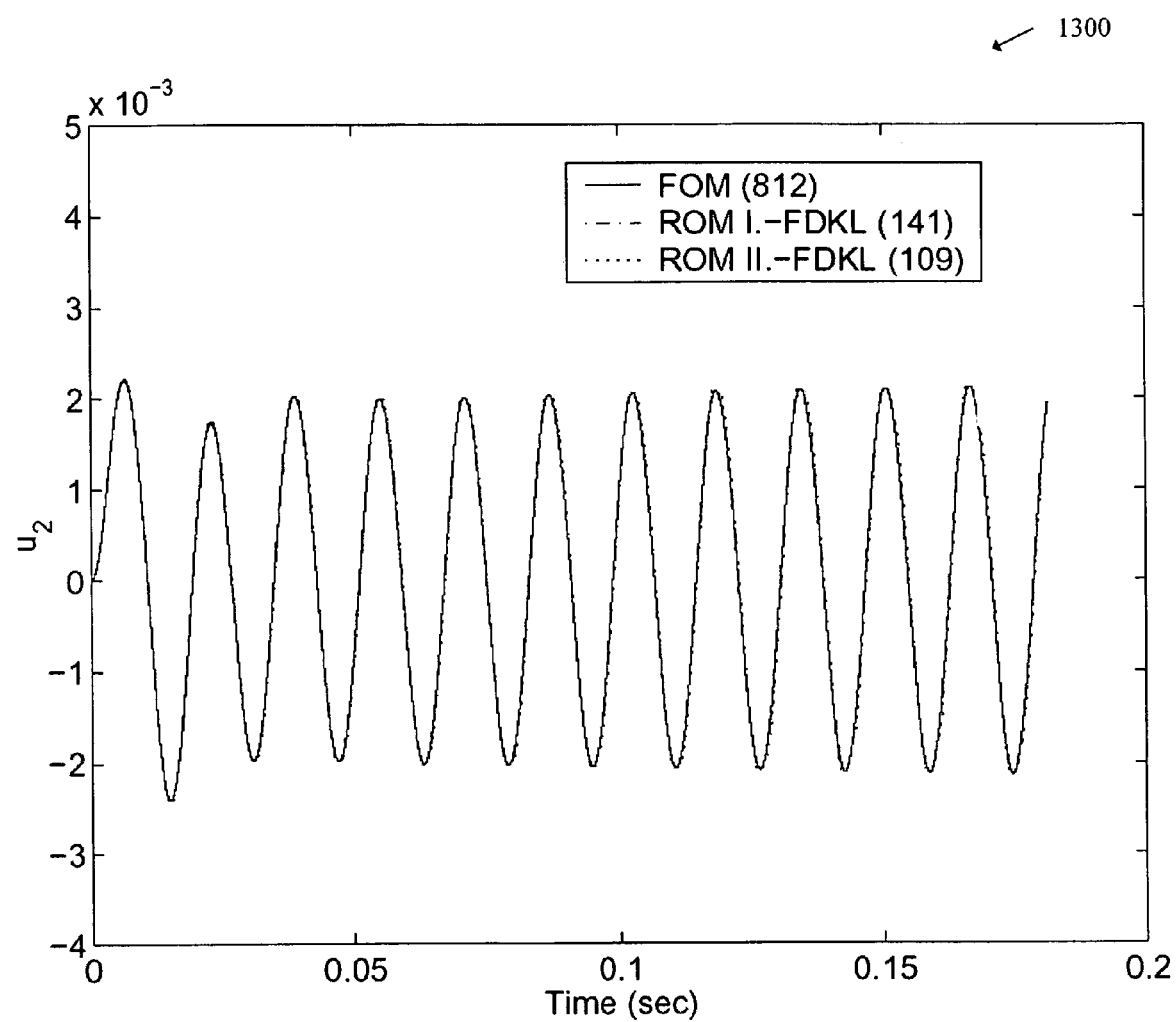
FIG. 13 shows an aeroelastic time response of the second structural mode computed using the vortex lattice formulation of FIG. 3 for V=121.2 m/sec.

Similarly, FIGS. 10-13 show the aeroelastic results at V=121.2 m/sec. Specifically, FIG. 10 shows a set of aeroelastic eigenvalues 1000 computed using the vortex lattice formulation of FIG. 3 at a first scale for V=121.2 m/sec. FIG. 11 shows a set of aeroelastic eigenvalues 1100 computed using the vortex lattice formulation of FIG. 3 at a second scale for V=121.2 m/sec. FIG. 12 shows a time response 1200 of the first structural mode computed using the vortex lattice formulation of FIG. 3 for V=121.2 m/sec. And FIG. 13 shows a time response 1300 of the second structural mode computed using the vortex lattice formulation of FIG. 3 for V=121.2 m/sec. As can be seen from these figures, the wing is on the verge of flutter at this speed. It may be noted how accurately the ROM I.-FDKL is able to reproduce neutrally stable, sinusoidal time responses (FIGS. 12-13). However, the ROM II.-FDKL exhibits a noticeable but minor error in producing the transient response.

Figure 14:
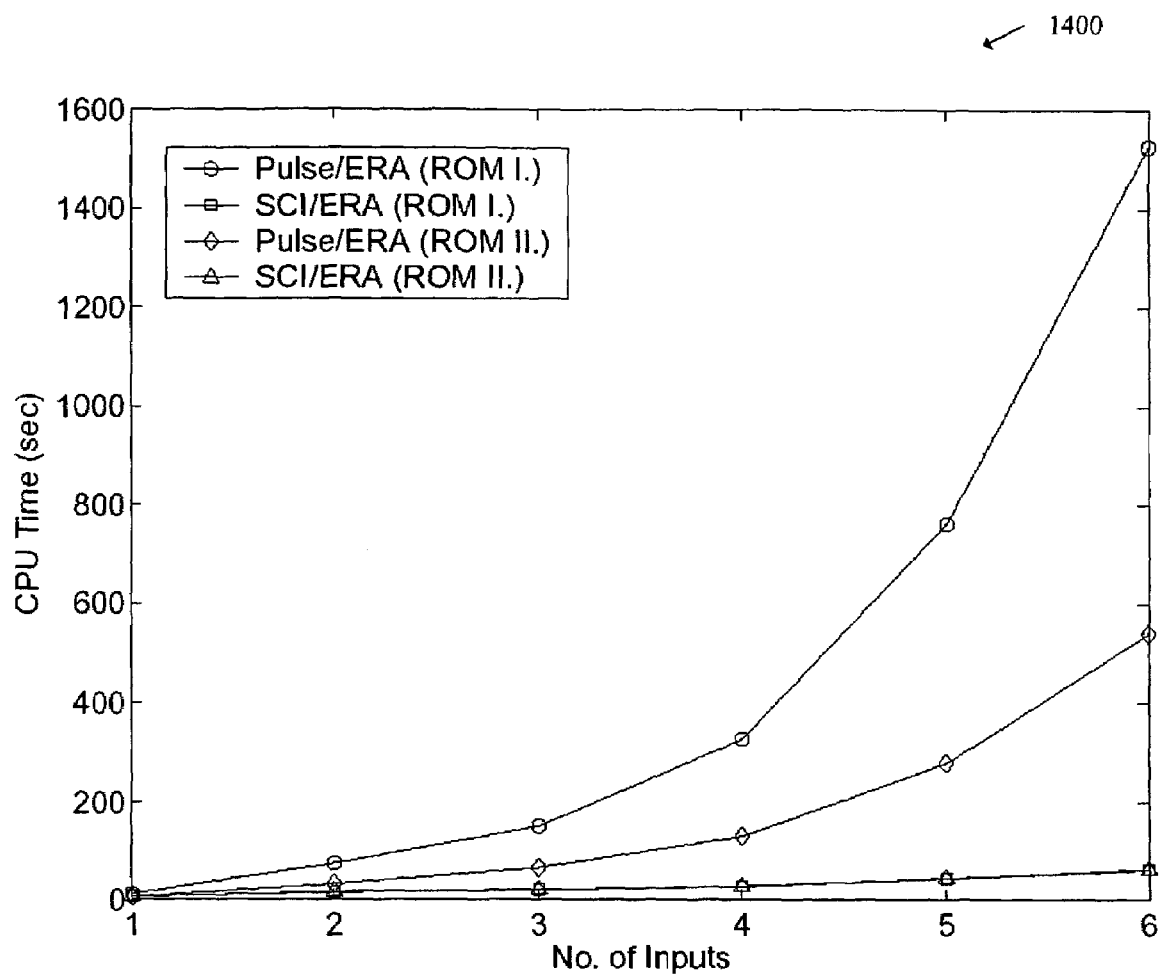
FIG. 14 shows a graph of model construction time of different ERA methods versus number of inputs for the vortex lattice formulation of FIG. 3.

FIG. 14 shows a graph 1400 of model construction time of VLM ERA ROMs versus number of inputs for the vortex lattice formulation of FIG. 3. Using FIG. 14, the model construction time may be compared between the two ERA methods. In order to obtain accurate and consistent singular modes, $H_{c0}$, $H_{c1}$ matrices were kept as square as possible by keeping the number of time samples approximately equal to the total number of measurements which is the sum of the number of generalized aerodynamic forces and the number of auxiliary measurements. The same numbers of time steps and auxiliary outputs were used both in the Pulse/ERA and Sd/ERA. Thus, in the first case where only the first bending mode alone excites the flow field, M=131, $N_0$=131. In the second case where the first bending and first torsional modes were included, M=251, $N_0$=252, and in the third case where the first bending and torsional as well as the second bending modes excite the aerodynamic field, M=281, $N_0$=283. 4 and 5 inputs were also used with M=331, $N_0$=334 and M=411, $N_0$=415, respectively.

FIG. 15 shows CPU seconds spent constructing various models in accordance with embodiments of the present invention (Note that FIG. 14 was obtained based on the data in FIG. 15). Specifically, Table 1 of FIG. 15 shows CPU seconds spent in constructing ROM I. on a SGI machine. Also presented in parenthesis are the dimensions of the corresponding reduced-order models. Table 2. shows CPU seconds consumed for ROM II. on the SGI machine. The numbers shown in FIGS. 14 and 15 represent total CPU seconds spent not only in sampling the response but also processing the data in the subsequent ERA schemes. As seen in FIGS. 14 and 15, the new method clearly has an advantage over the Pulse/ERA in reducing the model construction time yielding saving factors of multiple numbers. Needless to say, as the number of inputs increases so does the saving. It is interesting that for a given number of inputs both ERA methods generate ROMs of very similar sizes. As expected, ROM II of the SCI/ERA are as small as 80% of the corresponding ROM I. Despite the different input channels, both SCI/ERA ROM I. and ROM II. require approximately the same CPU time implying that in the SCI/ERA the overall computation time is not very sensitive to the number of inputs;

In yet another embodiment of the present invention, the SCI/ERA method has also been applied to unsteady aerodynamic systems modeled by CFL3D code. CFL3D is a finite element program that based on the Navier-Stokes equations models nonlinear viscous, compressible fluid motion in subsonic as well as transonic flow fields. (see Krist, S. L., Biedron, R. T., and Rumsey, C. L., *CFL3D User's Manual (Version 5.0)*, The NASA Langley Research Center, Hampton, Va.). Although CFL3D describes statically and dynamically nonlinear flow, when subjected to a small amplitude it predicts dynamically linearized behavior of the flow field around the nonlinear static position in the form of Equations (58) and (59). For most practical aeroelastic analyses such as flutter prediction and dynamic gust loads calculation, the small amplitude approximation yields sufficiently accurate results.

The aeroelastic formulation for the CFD code is slightly different than for the vortex lattice case in that the second aerodynamic model discussed above is used but whenever the air speed V is changed the incremental time step $\Delta t$ is adjusted accordingly when discretizing the structural model, Equation (100). As in the Aeroelastic Model I, the resulting model can account for the effect of changing the free stream speed.

Figure 16:
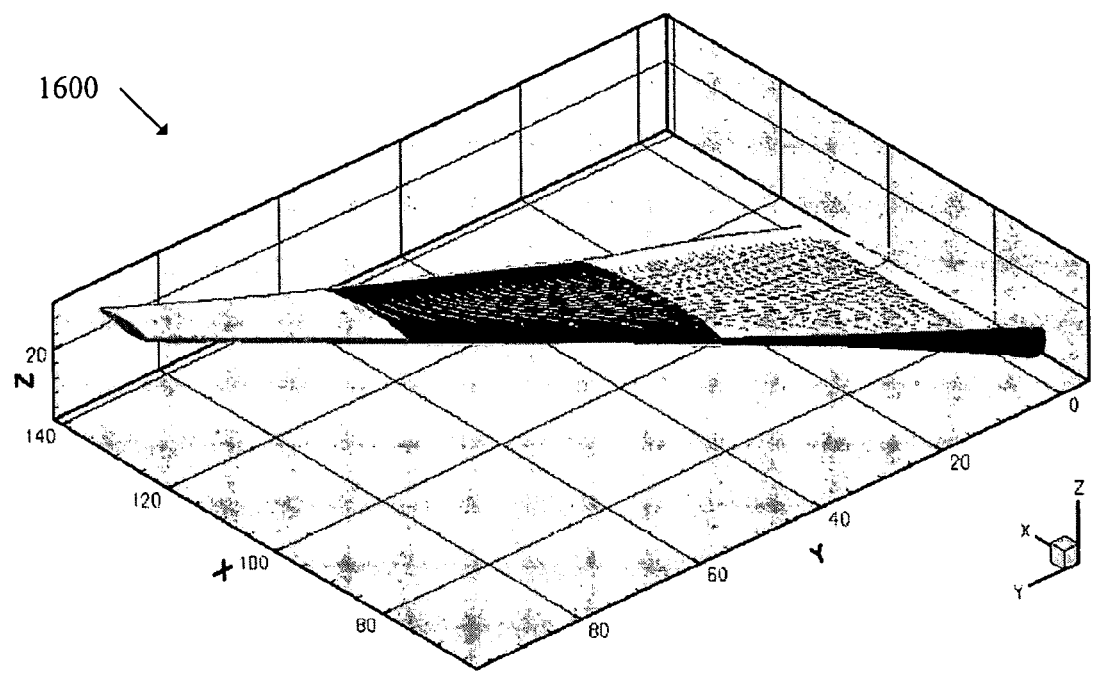
FIG. 16 is a representative CFL3D simulation model in accordance with an embodiment of the present invention.

For example, FIG. 16 is a representative CFD simulation model 1600 in accordance with an embodiment of the present invention. In this embodiment, the airplane configuration under consideration is that of the Twin-Engine-Transport-Flutter-Model (TETFM). The aerodynamic grid is given by the so called the Wing-Pencil-Nacelle (WPN) model with the strut between the wing and nacelle omitted. The structural motion is described by 10 structural modes, resulting in total of 10 generalized aerodynamic forces per a mode shape.

The computational aerodynamic model consists of approximately 700,000 cells and 30 blocks. For detailed description of the modeling, see Hong, M. S., Bhatia, K. G., SenGupta, G., Kim, T., Kuruvila, G., Silva, W. A., Bartels, and R., Biedron, R., *Simulations of a Twin-Engine Transport Flutter Model In the Transonic Dynamics Tunnel*, IFASD Paper 2003-US-44, incorporated herein by reference. Also, the details of the computational model and construction of the aerodynamic and aeroelastic ROMs based on the SCI/ERA using various types of input signals mentioned earlier is described more fully in Kim, T., Hong, M. S., Bhatia, K. G., SenGupta, G., *Aeroelastic Model Reduction for an Affordable CFD Based Flutter Analysis*, AIAA Paper 2004-2040, published subsequent to the filing of the present application in the AIAA Journal at Vol. 43, No. 12, December, 2005, p.p. 2487-2495 and incorporated herein by reference.

Figure 17:
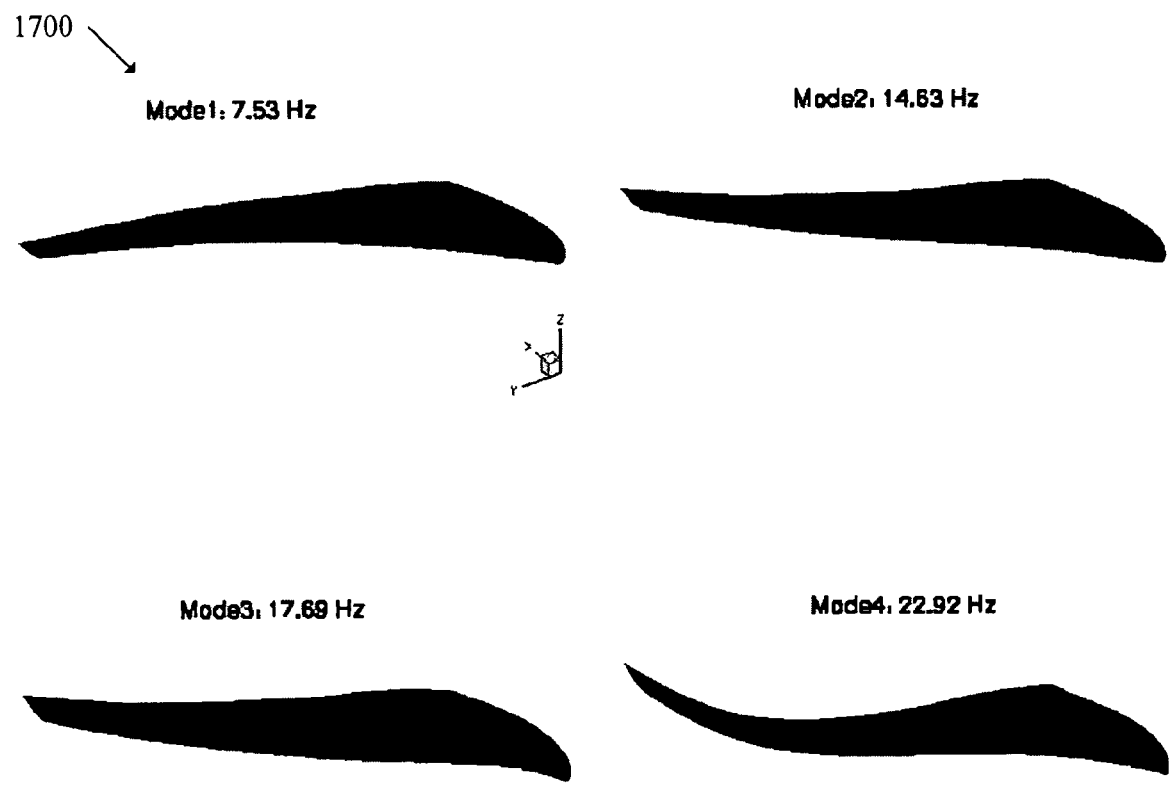
FIG. 17 shows four structural mode shapes used for the CFL3D simulation model of FIG. 16.

FIG. 17 shows four structural mode shapes 1700 used for the CFD simulation model 1600 of FIG. 16.

Figure 18:
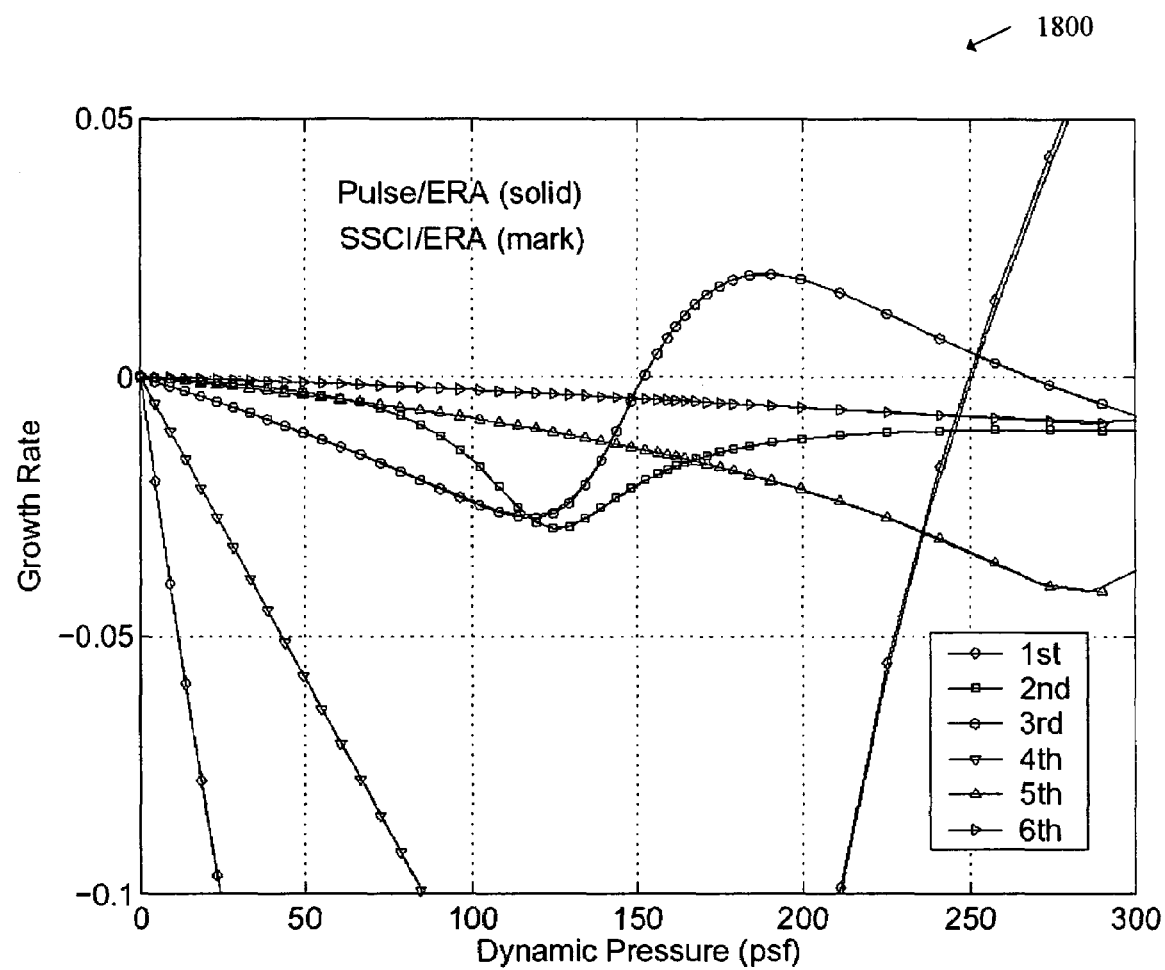
FIG. 18 shows a V-g plot of two different reduced-order aeroelastic models based on the CFL3D simulation in accordance with an embodiment of the present invention.

FIG. 18 shows a V-g plot 1800 of the two different aeroelastic models in accordance with the previous and an embodiment of the present invention, respectively. The WPN model was examined at M=0.831. With $\Delta t=3.34\times10^{-4}$ sec and 995 time steps, aerodynamic ROMs were created using both the Pulse/ERA and SSCI/ERA methods based on the displacement method described earlier (ROM II.). The size of the aerodynamic ROMs is (512×512). Given the 10 mode inputs, the total number of time steps consumed in the time marching required for the SCI/ERA process was 995+81×10=1805. On the other hand, the traditional ERA required total of 10×995=9,950. Using a single CPU of IBM/Regatta machine, the total CPU hours for the Pulse/ERA calculation was 366 while the SSCI/ERA required only 64 hours. Thus, the computational cost was reduced by a factor of 5.7. As shown in FIG. 18, the two ROMs match very well in flutter characteristics predicting the two flutter points within just 0.13% and 0.36% differences, respectively.

In accordance with embodiments of the present invention, efficient time-domain model reduction/system identification techniques have been presented and demonstrated for linear dynamic systems that are subjected to multiple right-hand-side inputs. Methods and systems in accordance with the present invention do not require modifying the original code and take only input and output data for the model construction. Furthermore, methods in accordance with the present invention are based on a direct singular value decomposition of the output measurements that are not necessarily attributed to pulse inputs but due to multiple signal inputs applied simultaneously at the input channels. Compared to the Pulse/ERA, the SCI/ERA methods disclosed herein can significantly reduce the model construction time and compress the amount of output data. Therefore, such methods and systems are very attractive for large-scaled dynamic systems with multiple driving inputs such as CFD models wherein the moving boundary input is often described by many structural modes.

While preferred and alternate embodiments of the invention have been illustrated and described, as noted above, many changes can be made without departing from the spirit and scope of the invention. Accordingly, the scope of the invention is not limited by the disclosure of the preferred and alternate embodiments. Instead, the invention should be determined entirely by reference to the claims that follow.

What is claimed is:

1. A method of model reduction and system identification of a dynamic system with multiple inputs, comprising:

generating a plurality of statistically independent random numbers for use as input signals; and performing a singular-value-decomposition directly on a system response of the dynamic system due to a simultaneous excitation of the plurality of input signals.

2. The method of claim 1, further comprising sampling individual pulse responses for a first time step and a second time step generated by subjecting the dynamic system to first and second pulses to provide Markov parameters for the first and second time steps.

3. The method of claim 1, further comprising, for the system response generated by the simultaneous excitation of the plurality of input signals, sampling the system response $y^n$ for n=0, 1, 2, . . . M to provide a Single-Composite-Input (SCI) response for a set of M steps.

4. The method of claim 3, further comprising defining Hankel-like matrices $H_{c0}$ and $H_{c1}$ using the SCI response for the set of M steps as follows:

$$H_{c0} \equiv \| y_{c0}^1 \quad y_{c0}^2 \quad \ldots \quad y_{c0}^{M-1} \| \quad (25)$$
$$= C \| x^1 \quad x^2 \quad \ldots \quad x^{M-1} \|$$

$$H_{c1} \equiv \| y_{c1}^1 \quad y_{c1}^2 \quad \ldots \quad y_{c1}^{M-1} \| \quad (26)$$
$$= CA \| x^1 \quad x^2 \quad \ldots \quad x^{M-1} \|$$

SVD of $H_{c0}$ yields

-continued $$H_{c0} \equiv U\Sigma V^T \quad (27)$$

$$\simeq | U_R \quad U_D | \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T.$$

5. The method of claim 4, wherein performing a singular-value decomposition includes performing a singular-value decomposition on the Hankel-like matrices $H_{c0}$ and $H_{c1}$ to obtain system matrices (A, B, C, D) as follows:

$$D = Y^0 \quad (28)$$

$$C \simeq U_R \sum_R^{1/2} \quad (29)$$

$$B \simeq \sum_R^{-1/2} U_R^T Y^1 \quad (30)$$

$$A \simeq \sum_R^{-1/2} U_R^T H_{c1} V_R \sum_R^{-1/2}. \quad (31)$$

6. The method of claim 4, wherein (M−1)≧R and N0≧R.

7. The method of claim 4, wherein a total number of input samples is equal to M+1+2×Ni.

8. The method of claim 3, further comprising defining augmented $H_{c01}$ and $H_{c11}$ matrices using the SCI response for the set of M steps as follows:

$$H_{c0I} \equiv \begin{bmatrix} C \\ CA \\ CA^2 \\ \vdots \\ CA^K \end{bmatrix} \| x^1 \quad x^2 \quad \ldots \quad x^{M-1} \| \quad (32)$$

$$= \begin{bmatrix} y_{c0}^1 & y_{c0}^2 & \ldots & y_{c0}^{M-1} \\ y_{c1}^1 & y_{c1}^2 & \ldots & y_{c1}^{M-1} \\ \ldots & \ldots & \ldots & \ldots \\ y_{cK}^1 & y_{cK}^2 & \ldots & y_{cK}^{M-1} \end{bmatrix}$$

$$H_{c1I} \equiv \begin{bmatrix} C \\ CA \\ CA^2 \\ \vdots \\ CA^K \end{bmatrix} A \| x^1 \quad x^2 \quad \ldots \quad x^{M-1} \| \quad (33)$$

$$= \begin{bmatrix} y_{c1}^1 & y_{c1}^2 & \ldots & y_{c1}^{M-1} \\ y_{c2}^1 & y_{c2}^2 & \ldots & y_{c2}^{M-1} \\ \ldots & \ldots & \ldots & \ldots \\ y_{cK+1}^1 & y_{cK+1}^2 & \ldots & y_{cK+1}^{M-1} \end{bmatrix}$$

where $$y_{ck}^n \equiv CA^k x^n$$

$$= y^{n+k} - \sum_{i=1}^{N_i} y_i^0 r_i^{n+k} - \sum_{i=1}^{N_i} y_i^1 r_i^{n+k-1} - \ldots - \sum_{i=1}^{N_i} y_i^k r_i^n.$$

9. The method of claim 8, wherein a total number of input samples is equal to M+1+K+(2+K)×Ni.

10. The method of claim 1, wherein at least some of the input signals are filtered through a low-pass filter.

11. The method of claim 1, wherein the plurality of input signals includes applying multiple step inputs in a sequential manner.

12. The method of claim 1, wherein the plurality of input signals includes applying multiple pulse inputs in a sequential manner.

13. The method of claim 5, further comprising performing a second order reduction on the system matrices (A, B, C, D) based on a Frequency-Domain Karhunen-Loeve (FDKL) method.

14. The method of claim 13, further comprising premultiplying the system matrices (A, B, C, D) by ΦT to yield a new reduced-order model as follows:

$$p^{n+1} = A_1 p^n + B k_1 u^n \quad (53)$$

$$y^n = C_1 p^n + D u^n \quad (54)$$

where $$A_1 \equiv \Phi^T A \Phi \quad (55)$$

$$B_1 \equiv \Phi^T B \quad (56)$$

$$C_1 \equiv C \Phi. \quad (57)$$

15. A method of model reduction and system identification of a dynamic system with multiple inputs, comprising:

generating a plurality of statistically independent random numbers for use as input signals; and performing a singular-value-decomposition directly on a system response of the dynamic system due to a simultaneous excitation of the plurality of input signals; sampling individual pulse responses for a first time step and a second time step; defining $H_{c0}$ and $H_{c1}$ matrices as follows:

$$H_{c0} \equiv \| y_{c0}^1 \quad y_{c0}^2 \quad \ldots \quad y_{c0}^{M-1} \| \quad (25)$$

$$= C \| x^1 \quad x^2 \quad \ldots \quad x^{M-1} \|$$

$$H_{c1} \equiv \| y_{c1}^1 \quad y_{c1}^2 \quad \ldots \quad y_{c1}^{M-1} \| \quad (26)$$

$$= CA \| x^1 \quad x^2 \quad \ldots \quad x^{M-1} \|$$

SVD of $H_{c0}$ yields $$H_{c0} \equiv U\Sigma V^T \quad (27)$$

$$\simeq | U_R \quad U_D | \begin{bmatrix} \sum_R & 0 \\ 0 & 0 \end{bmatrix} \begin{bmatrix} V_R^T \\ V_D^T \end{bmatrix}$$

$$= U_R \sum_R^{1/2} \sum_R^{1/2} V_R^T;$$

and obtaining system matrices (A, B, C, D) by a least square approximation as follows:

$$D = Y^0 \quad (28)$$

$$C \simeq U_R \sum_R^{1/2} \quad (29)$$

-continued $$B \simeq \sum_R {}^{-1/2} U_R^T Y^1 \qquad (30)$$

$$A \simeq \sum_R {}^{-1/2} U_R^T H_{cI} V_R \sum_R {}^{-1/2}. \qquad (31)$$

16. The method of claim 15, wherein at least some of the input signals are filtered through a low-pass filter.

17. The method of claim 15, wherein the plurality of input signals includes applying multiple step inputs in a sequential manner.

18. The method of claim 15, wherein the plurality of input signals includes applying multiple pulse inputs in a sequential manner.

19. The method of claim 15, further comprising performing a second order reduction on the system matrices (A, B, C, D) using a Frequency-Domain Karhunen-Loeve (FDKL) method.

20. A method of simulating a fluid flow, comprising:
generating a plurality of statistically independent random numbers for use as input signals; and
performing a singular-value-decomposition directly on a fluid response due to a simultaneous excitation of the plurality of input signals.

21. The method of claim 20, further comprising sampling individual pulse responses for first and second time steps generated by subjecting the dynamic system to first and second pulses to provide Markov parameters for the first and second time steps.

22. The method of claim 20, further comprising, for the system response generated by the simultaneous excitation of the plurality of input signals, sampling the system response $y^n$ for n=0, 1, 2, . . . M to provide a Single-Composite-Input (SCI) response for a set of M steps, and defining $H_{c0}$ and $H_{c1}$ matrices using the SCI response for the set of M steps as follows:

$$H_{c0} \equiv \| y_{c0}^1 \quad y_{c0}^2 \quad \ldots \quad y_{c0}^{M-1} \| \qquad (25)$$
$$= C \| x^1 \quad x^2 \quad \ldots \quad x^{M-1} \|$$

$$H_{c1} \equiv \| y_{c1}^1 \quad y_{c1}^2 \quad \ldots \quad y_{c1}^{M-1} \| \qquad (26)$$
$$= CA \| x^1 \quad x^2 \quad \ldots \quad x^{M-1} \|$$

SVD of $H_{c0}$ yields $$H_{c0} \equiv U\Sigma V^T \qquad (27)$$

$$\simeq | U_R \quad U_D | \begin{bmatrix} \sum_R & 0 \\ 0 & 0 \end{bmatrix} \begin{bmatrix} V_R^T \\ V_D^T \end{bmatrix}$$

$$= U_R \sum_R {}^{1/2} \sum_R {}^{1/2} V_R^T.$$

23. The method of claim 22, wherein performing a singular-value decomposition includes performing a singular-value decomposition on the matrices $H_{c0}$ and $H_{c1}$ to obtain system matrices (A, B, C, D) approximately as follows:

$$D = Y^0 \qquad (28)$$

$$C \simeq U_R \sum_R {}^{1/2} \qquad (29)$$

$$B \simeq \sum_R {}^{-1/2} U_R^T Y^1 \qquad (30)$$

$$A \simeq \sum_R {}^{-1/2} U_R^T H_{cI} V_R \sum_R {}^{-1/2}. \qquad (31)$$

24. The method of claim 22, further comprising, for the system response generated by the simultaneous excitation of the plurality of input signals, sampling the system response $y^n$ for n=0, 1, 2, . . . M to provide a Single-Composite-Input (SCI) response for a set of M steps, and defining augmented $H_{c01}$ and $H_{c11}$ matrices using the SCI response for the set of M steps as follows:

$$H_{c0I} \equiv \begin{bmatrix} C \\ CA \\ CA^2 \\ \vdots \\ CA^K \end{bmatrix} \| x^1 \quad x^2 \quad \ldots \quad x^{M-1} \| \qquad (32)$$

$$= \begin{bmatrix} y_{c0}^1 & y_{c0}^2 & \cdots & y_{c0}^{M-1} \\ y_{c1}^1 & y_{c1}^2 & \cdots & y_{c1}^{M-1} \\ \cdots & \cdots & \cdots & \cdots \\ y_{cK}^1 & y_{cK}^2 & \cdots & y_{cK}^{M-1} \end{bmatrix}$$

$$H_{cII} \equiv \begin{bmatrix} C \\ CA \\ CA^2 \\ \vdots \\ CA^K \end{bmatrix} A \| x^1 \quad x^2 \quad \ldots \quad x^{M-1} \| \qquad (33)$$

$$= \begin{bmatrix} y_{c1}^1 & y_{c1}^2 & \cdots & y_{c1}^{M-1} \\ y_{c2}^1 & y_{c2}^2 & \cdots & y_{c2}^{M-1} \\ \cdots & \cdots & \cdots & \cdots \\ y_{cK+1}^1 & y_{cK+1}^2 & \cdots & y_{cK+1}^{M-1} \end{bmatrix}$$

where $$y_{ck}^n \equiv CA^k x^n$$
$$= y^{n+k} - \sum_{i=1}^{N_i} y_i^0 r_i^{n+k} - \sum_{i=1}^{N_i} y_i^1 r_i^{n+k-1} - \ldots - \sum_{i=1}^{N_i} y_i^k r_i^n.$$

25. The method of claim 20, wherein at least some of the input signals are at least one of filtered through a low-pass filter, applied in multiple step inputs in a sequential manner, and applied in multiple pulse inputs in a sequential manner.

* * * * *